United States Patent
Nakamura et al.

(10) Patent No.: US 7,554,982 B2
(45) Date of Patent: Jun. 30, 2009

(54) COMMUNICATION TERMINAL AND COMMUNICATION NETWORK

(75) Inventors: Nobuyuki Nakamura, Osaka (JP); Youiti Kado, Kyoto (JP)

(73) Assignee: Oki Electric Industry Co., Ltd., Tokyo (JP)

(*) Notice: Subject to any disclaimer, the term of this patent is extended or adjusted under 35 U.S.C. 154(b) by 951 days.

(21) Appl. No.: 10/845,199

(22) Filed: May 14, 2004

(65) Prior Publication Data

US 2004/0258064 A1 Dec. 23, 2004

(30) Foreign Application Priority Data

May 16, 2003 (JP) ............... 2003-138542
Nov. 11, 2003 (JP) ............... 2003-380820

(51) Int. Cl.
*H04L 12/28* (2006.01)
*H04L 12/54* (2006.01)
(52) U.S. Cl. ................. 370/392; 370/428
(58) Field of Classification Search ......... 370/338, 370/351, 389, 390, 392, 395.31, 395.32, 370/395.4, 400, 401, 428, 429
See application file for complete search history.

(56) References Cited

U.S. PATENT DOCUMENTS

| | | | |
|---|---|---|---|
| 5,940,771 A * | 8/1999 | Gollnick et al. | 455/517 |
| 6,028,857 A | 2/2000 | Poor | |
| 6,597,684 B1 * | 7/2003 | Gulati et al. | 370/351 |
| 7,260,518 B2 * | 8/2007 | Kerr et al. | 703/27 |
| 7,401,217 B2 * | 7/2008 | Huang et al. | 713/153 |
| 7,453,864 B2 * | 11/2008 | Kennedy et al. | 370/351 |

FOREIGN PATENT DOCUMENTS

| | | |
|---|---|---|
| JP | 08-037535 | 2/1996 |
| JP | 2001-7762 A | 1/2001 |

(Continued)

OTHER PUBLICATIONS

T. Okuda, U. Ino, S. Ishihara and T. Watanabe, "A reliable study of ad hoc multihop routing" IPSJ SIG Notes 2001-MBL-16-5, vol. 2001, No. 13, pp. 31-38, Information Processing Society of Japan, Feb. 14, 2001.

(Continued)

*Primary Examiner*—Seema S Rao
*Assistant Examiner*—Mon Cheri S Davenport
(74) *Attorney, Agent, or Firm*—Venable LLP; Michael A. Sartori; Catherine M. Voorhees

(57) ABSTRACT

Routing schemes are provided for a communication network. In one scheme, destination terminals and associated neighboring terminals are listed in a routing control cache at each communication terminal in the network, and packets are routed toward the destination terminal through the associated neighboring terminals. In another scheme, a single path from a source terminal to a destination terminal is automatically expanded into multiple paths. In yet another scheme, packets are routed as long as this does not increase the number of hops to the destination terminal. These schemes enable multiple paths to be established by a simple procedure not requiring complex distance calculations. In still another scheme, routing is restricted to the shortest path and paths up to a given number of hops longer than the shortest path, permitting paths to diverge in multiple directions from the source and destination terminals.

13 Claims, 20 Drawing Sheets

FOREIGN PATENT DOCUMENTS

JP            2001-237875         8/2001

OTHER PUBLICATIONS

S. Furusho, T. Kitasuka, T. Nakanishi and A. Fukuda, "Mobility based algorithm for mobile ad hoc network" IPSJ SIG Notes 2003-MBL-24-3, vol. 2003, No. 2, pp. 13-19, Information Processing Society of Japan, Mar. 7, 2003.

Marina et al., "On-demand Multipath Distance Vector Routing in Ad Hoc Networks," University of Cincinnati, 2001.

Perkins et al., "Ad hoc On-Demand Distance Vector (AODV) Routing," Network Working Group, The Internet Society, Jul. 2003.

N. Nakamura, "Low latency route switching for wireless ad hoc networks", IEICE Technical Report vol. 103 No. 421, Japan, The Institute of Electronics, Information and Communication Engineers, Nov. 7, 2003, pp. 13-18.

K. Yamazaki et al.: "An Ad hoc routing protocol with obstacle evasion", IEICE Technical Report vol. 102 No. 693, Japan, The Institute of Electronics, Information and Communication Engineers, Feb. 27, 2003, pp. 5-10.

* cited by examiner

FIG.2

| NEIGHBORING TERMINAL ID | RETENTION TIME |
|---|---|
| A | 100s |
| B | 20s |

FIG.3

| DESTINATION TERMINAL ID | NEIGHBORING RELAY TERMINAL ID | RELAY TIME |
|---|---|---|
| Z | A | 596s |
| Z | B | 280s |
| P | C | 484s |

FIG.8
| TERMINAL ID | TERMINAL ID | RELAY TIME |
|---|---|---|
| S | D | 600s |
| P | Q | 2s |
FIG.9
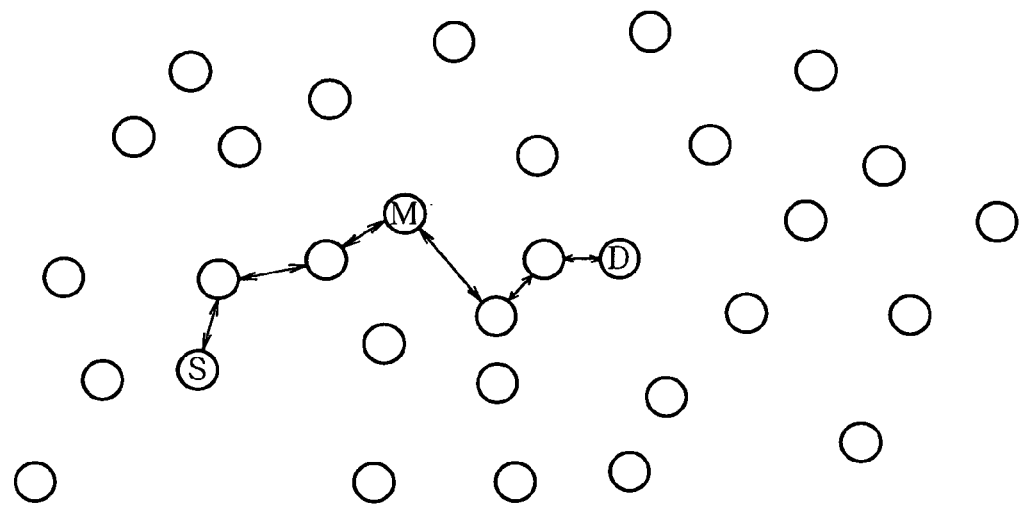
FIG.10
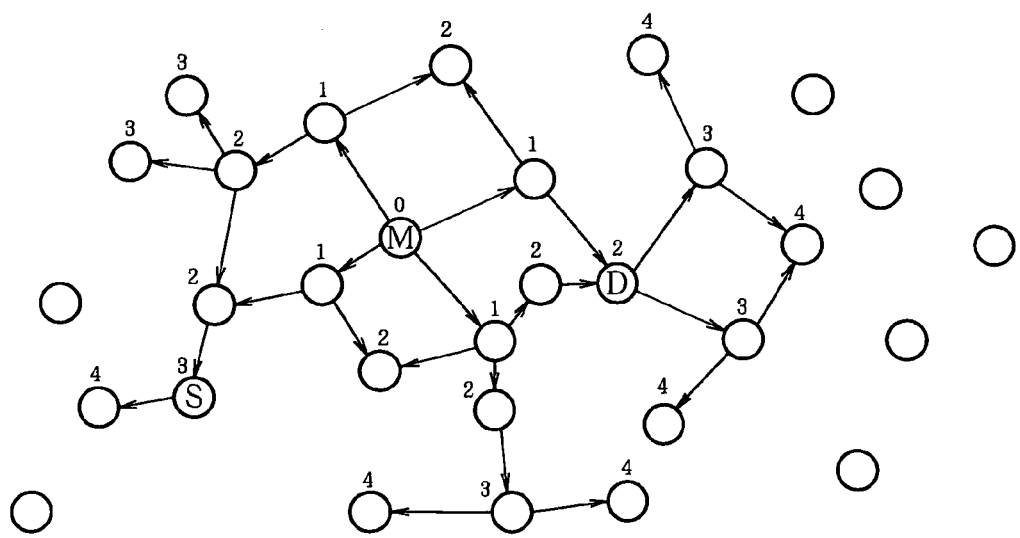

FIG.14
| DESTINATION TERMINAL ID | HOPCOUNT TO DESTINATION | RELAY TIME |
|---|---|---|
| S | 5 | 476s |
| D | 3 | 362s |
FIG.15
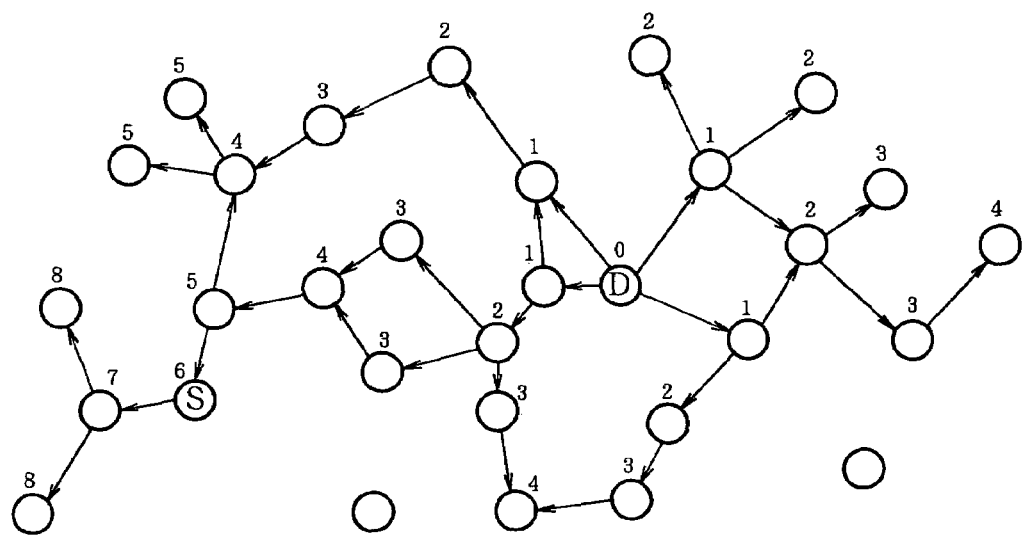
FIG.16
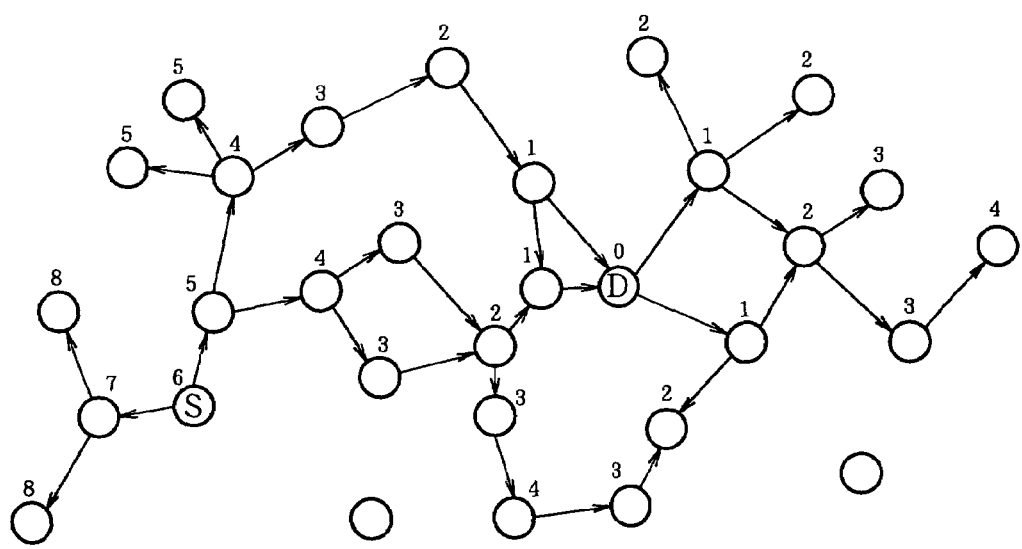

| TERMINAL ID | VELOCITY | DIRECTION |
|---|---|---|
| SELF TERMINAL | 4.001km/h | (1.120, 2.001) |
| Q | 0.000km/h | (0001, −0.000) |
| M | 4.111km/h | (1.001, 1.995) |

FIG.21

| TERMINAL ID | HOPCOUNT | RETENTION TIME |
|---|---|---|
| S | 4 | 60s |
| D | 5 | 90s |
| ..... | ..... | ..... |
| ..... | ..... | ..... |

FIG.22

| DESTINATION | NEIGHBORING RELAY TERMINALS | RETENTION TIME | PACKET ID |
|---|---|---|---|
| S | A,B | 40s | 6987682 |
| D | C,E,F | 30s | 6108907 |
| ..... | ..... | ..... | ..... |
| ..... | ..... | ..... | ..... |

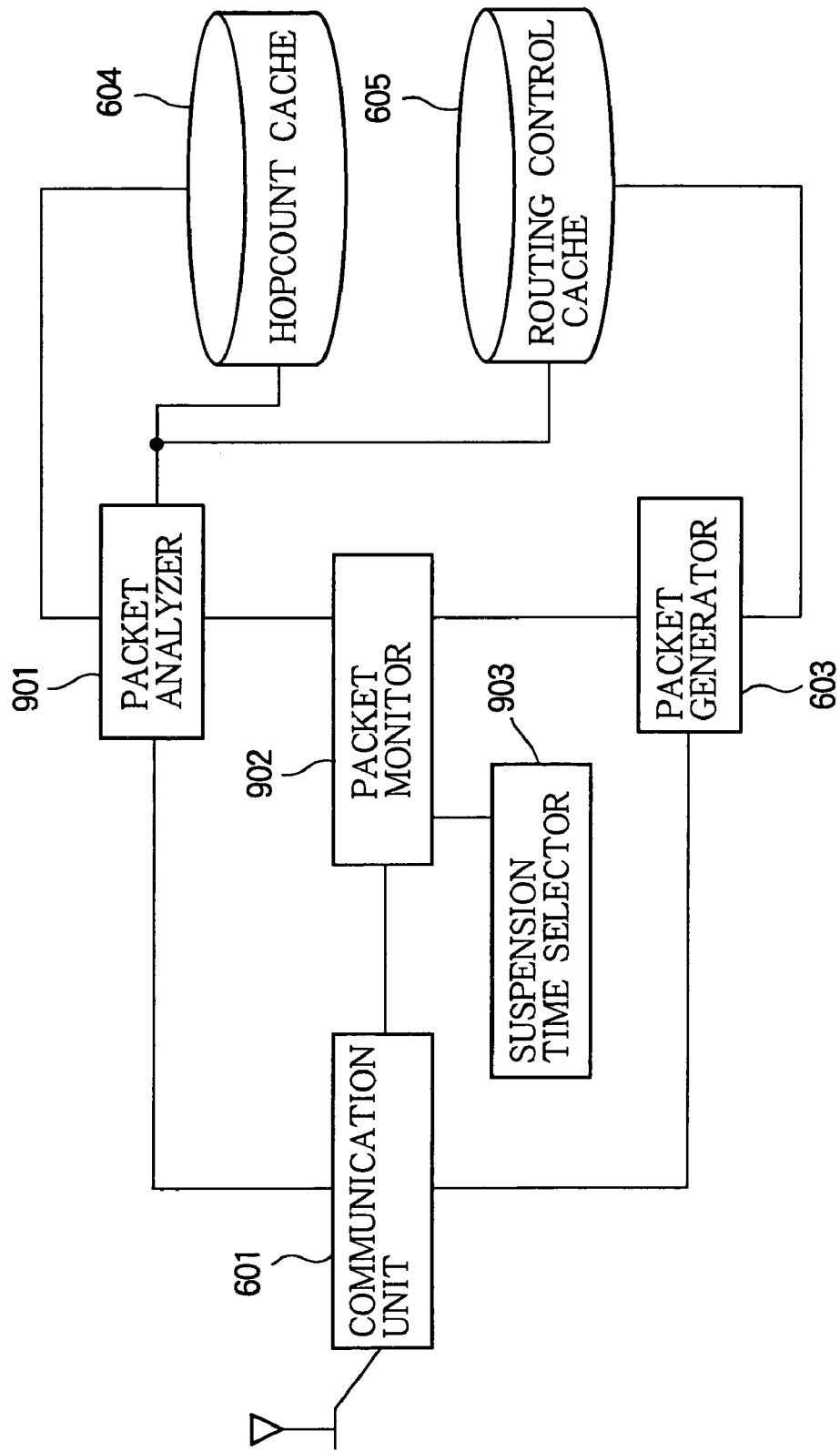

COMMUNICATION TERMINAL AND COMMUNICATION NETWORK

BACKGROUND OF THE INVENTION

1. Field of the Invention

The present invention relates to a communication network such as an ad hoc network comprising a plurality of communication terminals, to the terminals in the network, and in particular to the routing method employed in the network.

2. Description of the Related Art

Communication in an ad hoc network takes place by the routing of packets from a source terminal to a destination terminal on a path that may lead through one or more intermediate or relay terminals. All of the terminals in the network are capable of operating as routers, that is, of designating the paths or routes that packets will follow. The routing methods employed in an ad hoc network include both single-path and multipath schemes.

Conventional single-path routing decreases the amount of usage of network resources by selecting a single path between the source terminal and the destination terminal and switching data on that path as described in, for example, Japanese Unexamined Patent Application Publication No. H8-37535. The problem with single-path routing is that if a terminal on the single designated path drops out because, for example, its battery runs down, or because the terminal moves to another location, the path is broken and communication ceases. Another path must then be set up to continue the communication. The single-path communication process therefore tends to be unstable with frequent interruptions.

In conventional multipath routing, a complex process is carried out in advance to select a plurality of paths between the source terminal and the destination terminal, and data switching is carried out on those paths, as described in, for example, Japanese Unexamined Patent Application Publication No. 2001-237875. The plurality of communication paths reduces the likelihood of communication interruptions, because a failure on one path can generally be dealt with by immediately switching to another path, but the complex processing required to define the paths and make them available imposes a burden on the computational resources of the terminals. An additional problem is that the multiple paths tend to converge near the source and destination terminals, reducing path redundancy in these areas and making radio interference a problem. A further problem is that when communication is stable, multipath routing wastes network resources. This further problem could be overcome by switching between single-path routing and multipath routing, but that would only increase the complexity of the routing control process.

Further information can be found in U.S. Pat. No. 6,028,857 and in an article by Marina et al. entitled 'On-demand Multipath Distance Vector Routing in Ad Hoc Networks' published by the University of Cincinnati in 2001.

The problems of the conventional single-path and multipath routing schemes can be summarized as follows. Since single-path routing uses a single path, if a terminal on the path becomes unavailable because it has moved to another location or exhausted its battery charge, the path is broken, communication is cut off, and a new path must be set up before communication can resume. Communication therefore tends to be unstable. Although conventional multipath routing schemes can deal with such path breakdowns because they provide a plurality of communication paths, they also involve much control overhead: paths are selected through a complex computational process, and the paths have to be set up by an elaborate control process. Conventional multipath routing therefore tends to squander network resources. It would be desirable to have a multipath routing scheme that is more easily controlled and does not make such heavy use of network resources.

SUMMARY OF THE INVENTION

An object of the present invention is to provide communication terminals and communication networks that improve on conventional single-path and multipath routing schemes in order to stabilize communication, avoid radio interference, and effectively use network resources.

In one embodiment of the invention, each time a communication terminal receives a packet from a neighboring terminal, it stores the identifier (ID) of the neighboring terminal and the ID of the source terminal from which the data originated in association with each other in a routing control cache. The ID of the neighboring terminal is stored as a relay terminal ID; the ID of the source terminal is stored as a destination terminal ID. If the communication terminal already holds the ID of the destination terminal of the data in the routing control cache as a destination terminal ID, it also relays the data toward its destination through the neighboring relay terminal(s) associated with the destination terminal. This scheme enables multiple paths between two terminals to be established automatically, simply by having the two terminals flood the communication network with route request and reply messages, without requiring distance calculations or other complex processing.

In another embodiment of the invention, the routing control cache stores the IDs of associated pairs of endpoint terminals. A separate neighboring terminal ID storage unit is used to store the IDs of neighboring terminals from which the communication terminal receives data. If the source and destination terminals of the received data are associated as endpoint terminals in the routing control cache, the communication terminal routes the received data through the neighboring terminals listed in the neighboring terminal ID storage unit. When a source terminal wishes to communicate with a destination terminal, it selects a single path to the destination terminal, and sends a route request message to a terminal on the path. This terminal then sends route command messages to all terminals within a certain number of hops of itself. The route request message gives the IDs of the source and destination terminals as a pair of endpoint terminal IDs. The route command message instructs receiving terminals to put the endpoint terminal IDs in their routing control cache. This scheme enables a single path to be expanded to multiple paths without the need for complex processing.

In yet another embodiment of the invention, the routing control cache becomes a hopcount cache listing the number of hops from the communication terminal to various other terminals in the network, and the IDs of neighboring terminals are stored in a neighboring terminal ID storage unit. When the communication terminal receives data from a neighboring terminal, it consults the hopcount cache to determine whether the number of hops to the destination terminal of the data has increased in the last hop, abandons the data if this is the case, and otherwise relays the data to the neighboring terminals listed in the neighboring terminal ID storage unit. This scheme enables communication from a source terminal to a destination terminal to be initiated by having the destination terminal flood the network with route request messages, and establishes multiple paths automatically without the need for complex processing.

Still another embodiment of the invention uses both a routing control cache listing destination terminal IDs and associated relay terminal IDs, and a hopcount cache. A communication terminal relays received data toward its destination terminal through the associated relay terminals provided the sum of the number of hops from the source terminal and the number of hops to the destination terminal does not exceed a ceiling given in the received data. This scheme enables routing to be restricted to the shortest path (or paths) between the source and destination terminals, and paths with total hopcounts not exceeding the hopcount of the shortest path by more than a specified quantity. Besides enabling multiple paths to be set up automatically by a simple procedure, this routing scheme allows the paths to diverge in all directions from the source and destination terminals, thereby avoiding path convergence around those terminals, providing greater path redundancy, and reducing interference.

The hopcount ceiling may be originally set to the hopcount of the shortest path and then raised if communication proves unstable. Paths may also be prioritized according to, for example, the difference between their total hopcount and the hopcount of the shortest path, and routing may be restricted to paths with certain priority values to further reduce path crowding and usage of network resources. Alternatively, data received on lower-priority paths may be suspended temporarily and relayed toward the destination terminal only if not routed on a higher-priority path within a given suspension time.

In the above embodiments, the routing control cache, hopcount cache, and neighboring terminal ID storage unit may also store expiration times that are decremented with the elapse of time, and information may be deleted when its expiration time reaches zero.

The packets in the above embodiments include both data packets, which contain payload data, and control packets, which contain control information such as routing information or the like. More generally, the invention is applicable to networks that transmit any type of data in any form.

BRIEF DESCRIPTION OF THE DRAWINGS

In the attached drawings:

FIG. 2 illustrates exemplary data stored in the neighboring terminal ID storage unit;

FIG. 3 illustrates exemplary data stored in the routing control cache;

FIG. 8 illustrates exemplary data stored in the routing control cache in FIG. 7;

FIGS. 9, 10, and 11 illustrate the structure and operation of a communication network in the second embodiment;

FIG. 14 illustrates exemplary data stored in the hopcount cache in FIG. 13;

FIGS. 15 and 16 illustrate the structure and operation of a communication network in the third embodiment;

FIG. 21 illustrates exemplary data stored in the hopcount cache in FIG. 20;

FIG. 22 illustrates exemplary data stored in the routing control cache in FIG. 20;

FIG. 30 is a block diagram of a communication terminal in a ninth embodiment of the invention.

DETAILED DESCRIPTION OF THE INVENTION

Figure 1:
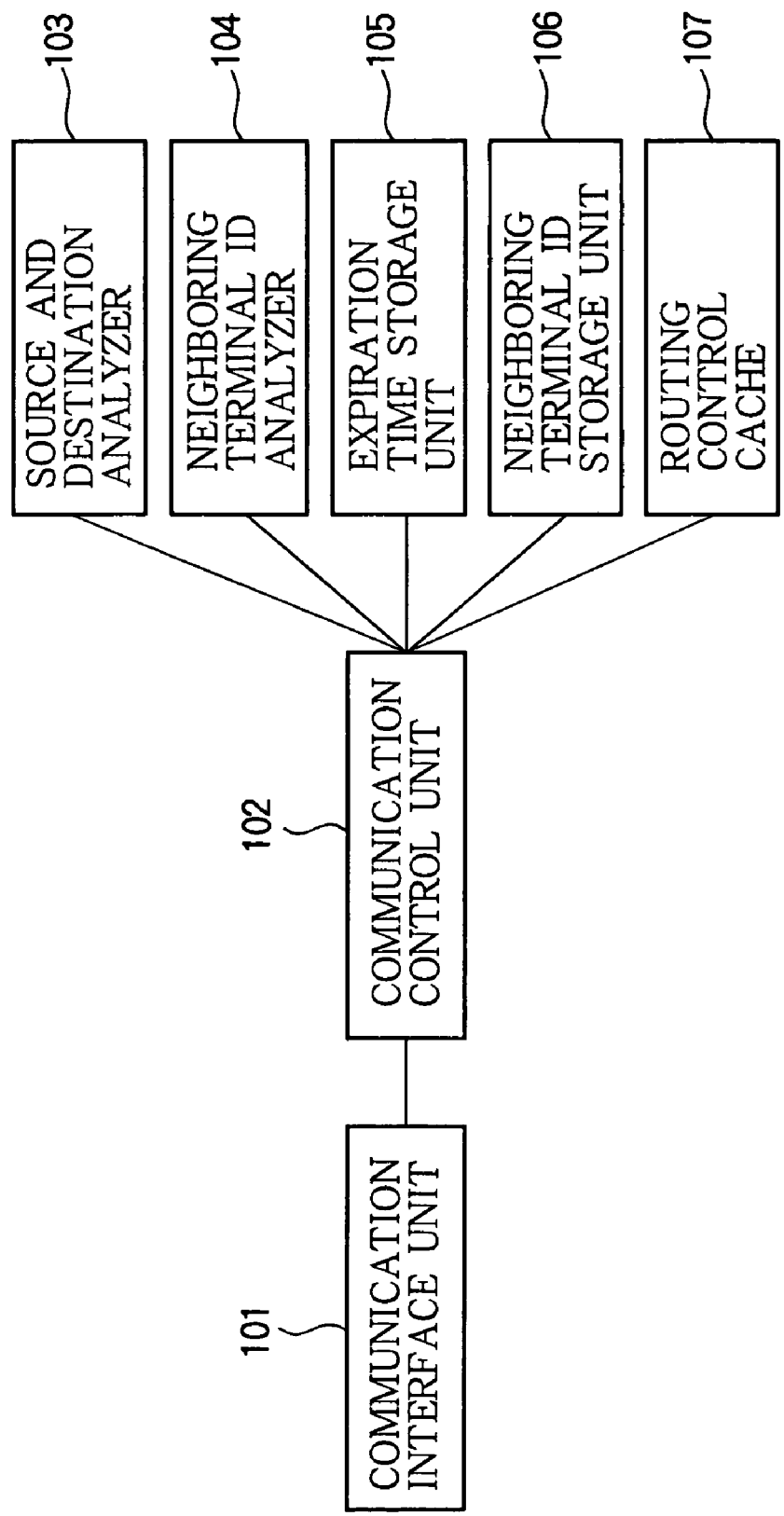
FIG. 1 is the block diagram of a communication terminal in a first embodiment of the invention.

Embodiments of the invention will now be described with reference to the attached drawings, in which like elements are indicated by like reference characters. Each embodiment is an ad hoc communication network using communication terminals with novel routing features.

First Embodiment

Referring to FIG. 1, each communication terminal in the first embodiment has a communication interface unit 101, a communication control unit 102, a source and destination analyzer 103, a neighboring terminal ID analyzer 104, an expiration time storage unit 105, a neighboring terminal ID storage unit 106, and a routing control cache 107, which are interconnected as shown. All of the elements shown in FIG. 1 may be implemented in hardware, but some of them may also be implemented partly or wholly in software executed on a general-purpose computing device such as a microprocessor.

The communication interface unit 101 interfaces with other communication terminals in the network.

The communication control unit 102 receives packets from the communication network via the communication interface unit 101, and sends packets to the communication network via the communication interface unit 101. The communication control unit 102 also sends received packets to the source and destination analyzer 103 and neighboring terminal ID analyzer 104 to be analyzed, and receives results of the analyses. From the source and destination analyzer 103, the communication control unit 102 receives the identifiers (IDs) of the source and destination terminals of each packet. From the neighboring terminal ID analyzer 104, the communication control unit 102 receives the ID of the neighboring terminal from which the packet was directly received. An ID may be an Internet protocol (IP) address, a media access control (MAC) address, or any other information that can be used to identify a terminal.

In addition, the communication control unit 102 sends relay time and retention time requests to the expiration time storage unit 105 and receives predetermined initial values of these times in return. A relay time indicates the expiration time of information held in the routing control cache 107. A retention time indicates the expiration time of information held in the neighboring terminal ID storage unit 106.

The communication control unit 102 sends the neighboring terminal ID storage unit 106 sets of information including the initial retention time value received from the expiration time storage unit 105 and a neighboring terminal ID received from the neighboring terminal ID analyzer 104.

The communication control unit 102 sends the routing control cache 107 sets of information including a destination terminal ID, a neighboring relay terminal ID, and an initial relay time value. The destination terminal ID is a source terminal ID obtained from a received packet by the source and destination analyzer 103; the neighboring relay terminal ID is the neighboring terminal ID obtained from the same packet by the neighboring terminal ID analyzer 104; the initial relay time value is the value obtained from the expiration time storage unit 105. The communication control unit 102 also queries the routing control cache 107 as to whether it holds the destination terminal ID obtained from the source and destination analyzer 103. If the destination terminal ID is held, the communication control unit 102 requests from the routing control cache 107 all neighboring relay terminal IDs held in association with the destination terminal ID, and transfers (routes) the received packet via the communication interface unit 101 to all the neighboring relay terminals with IDs returned from the routing control cache 107. If the routing control cache 107 does not hold the destination terminal ID, the communication control unit 102 does not transfer the received packet.

The source and destination analyzer 103 analyzes a packet received from the communication control unit 102 to obtain its source terminal ID and destination terminal ID, and sends these IDs to the communication control unit 102.

The neighboring terminal ID analyzer 104 analyzes a packet received from the communication control unit 102 to obtain the ID of the neighboring terminal from which the packet was directly received, and sends the neighboring terminal ID to the communication control unit 102.

The expiration time storage unit 105 holds predetermined initial values of the relay time relating to the path control cache and the retention time relating to the neighboring terminal ID storage unit 106, and sends these initial values to the communication control unit 102 on request. The predetermined initial values of the relay time and retention time are, for example, both 600 seconds.

The neighboring terminal ID storage unit 106 has a table storing data as shown in FIG. 2. Each entry in the table includes a neighboring terminal ID that has been received from the communication control unit 102, and an associated retention time. The values of the retention times held in the neighboring terminal ID storage unit 106 are decremented as time elapses so that they decrease from the initial value toward zero. When the neighboring terminal ID storage unit 106 receives a new set of information, if the neighboring terminal ID in the received information is not held in the table, the neighboring terminal ID storage unit 106 adds the information to the table as a new entry; if the neighboring terminal ID is already held in the table, the received information is overwritten on the existing entry in the table, restoring the retention time of the entry to the initial value. When the retention time value of an entry reaches zero, the entry is deleted from the table.

The routing control cache 107 has a table as shown in FIG. 3, each entry including a destination terminal ID, a neighboring relay terminal ID, and a relay time that have been received from the communication control unit 102. The relay time values held in the routing control cache 107 are decremented as time elapses so that they decrease from the initial value toward zero. When the routing control cache 107 receives a new set of information, if the destination terminal ID and neighboring relay terminal ID in the received information are not held in a single entry in the table, the routing control cache 107 adds the received information as a new entry to the table. If the destination terminal ID and neighboring relay terminal ID in the received information are already held in a single entry in the table, the received information is overwritten on the existing entry, restoring the relay time of the entry to the initial value. When the relay time of an entry reaches zero, the entry is deleted from the table.

The routing control cache 107, if queried from the communication control unit 102 for a destination terminal ID, returns information indicating whether it holds the destination terminal ID or not; if it holds the destination terminal ID and the communication control unit 102 requests the neighboring relay terminal IDs associated with the destination terminal ID, the routing control cache 107 returns all of the associated neighboring relay terminal IDs to the communication control unit 102. 'Associated' means that the neighboring relay terminal ID and destination terminal ID are held in the same entry in the routing control cache 107.

Operations of the communication terminal and communication network in the first embodiment will be described below with reference to FIGS. 1 to 6. The circles in FIGS. 4, 5, and 6 indicate communication terminals constituting the communication network. The description below concerns communication between the terminals marked S and D.

First, terminal S sends packets including a route request message requesting communication with terminal D to all other terminals in the network. These packets are routed by a flooding method in which received packets are simply transferred onward until they have reached all terminals in the network.

Figure 4:
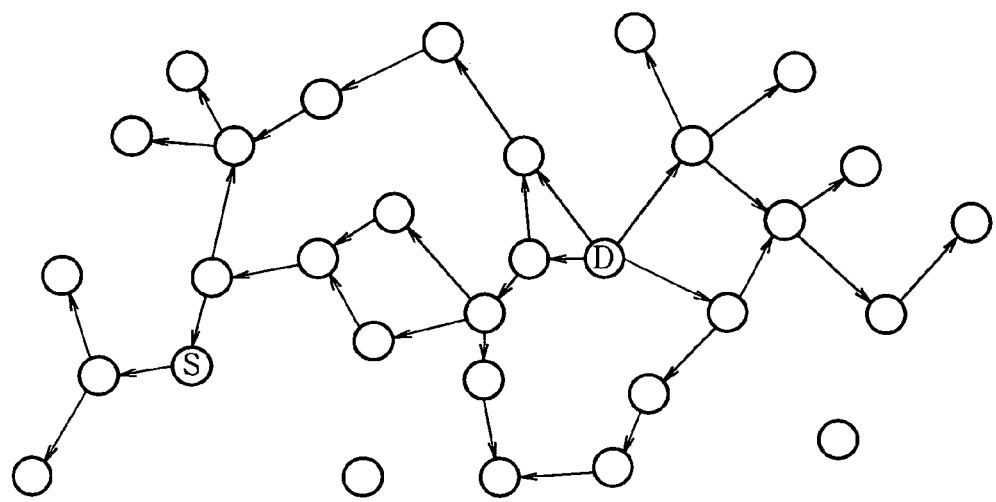
FIGS. 4, 5, and 6 illustrate the structure and operation of a communication network in the first embodiment.

When terminal D receives a packet with the route request message from terminal S, it floods the network with packets containing a route reply message indicating that terminal D can communicate with terminal S. This message is received by all other terminals in the network, including terminal S, as indicated in FIG. 4.

At each terminal that receives packets including the route request message or the route reply message (including terminal D for packets including the route request message and terminal S for packets including the reply message), the source and destination analyzer 103 analyzes each received packet to obtain its source terminal ID (the ID of terminal S or terminal D) and destination terminal ID (the ID of terminal D or terminal S), and the neighboring terminal ID analyzer 104 analyzes each received packet to obtain the ID of the neighboring terminal from which the packet was received. Each neighboring terminal ID obtained in this way is written in the neighboring terminal ID storage unit 106, together with the initial retention time obtained from the expiration time storage unit 105.

Figure 5:
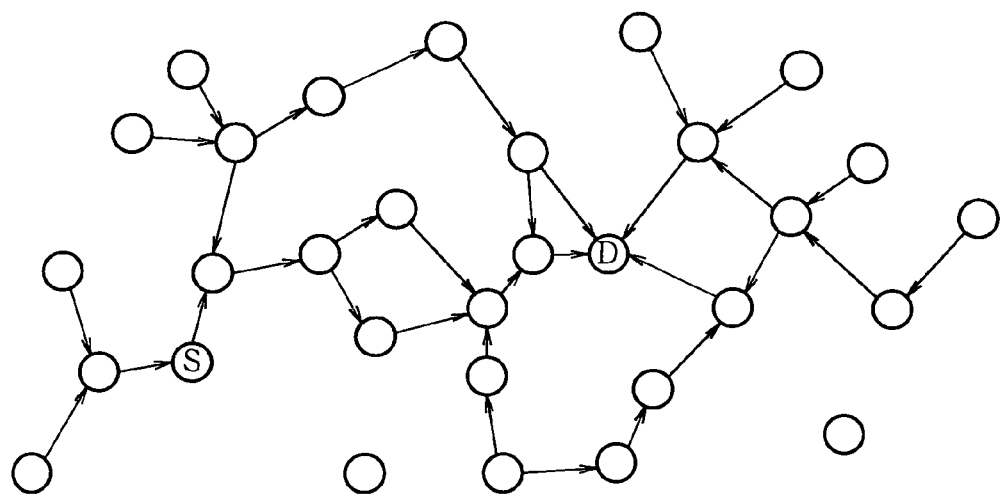

Similarly, the source terminal ID and neighboring terminal ID of each received packet are written in the routing control cache 107, together with the initial relay time value obtained from the expiration time storage unit 105. The source terminal ID is written in the routing control cache 107 as a destination terminal ID, and the neighboring terminal ID is written as a neighboring relay terminal ID. As a result of this process, given that the reply from terminal D has been routed as shown in FIG. 4, terminals receiving a packet destined for terminal D will route the packet as indicated in FIG. 5.

Figure 6:
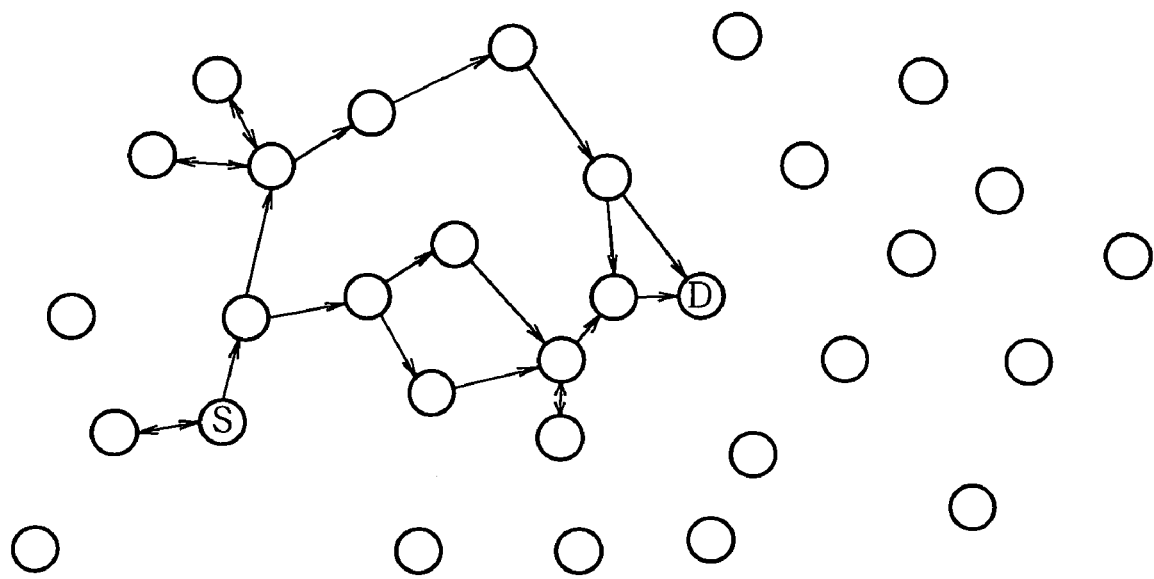

On reception of the route reply message packet sent from terminal D, the routing control cache 107 in terminal S holds the ID of terminal D as a destination terminal ID. Terminal S now proceeds to communicate with terminal D by sending packets destined for terminal D to all the neighboring relay terminals that are associated with terminal D in the routing control cache 107 of terminal S. These neighboring relay terminals then route the packets in the same way, sending copies of the received packet to all of their own neighboring relay terminals that are associated with destination terminal D in their own routing control cache 107. This procedure automatically selects multiple paths as shown in FIG. 6, enabling packets sent from terminal S to reach terminal D by redundant routes, so that communication can continue without interruption even if one of the relay terminals drops out. More specifically, in FIG. 6, any single relay terminal except the relay terminal nearest terminal S can drop out without interrupting communication.

Packets sent from terminal D to terminal S are routed in a similar way.

Packets sent from terminal S to terminal D continue to be routed as shown in FIG. 6 as long as the relay time value held in association with destination terminal D in the routing control caches 107 of the relaying terminals remains greater than zero. If communication with terminal D ceases long enough for the relay time to reach zero, the entries naming terminal D as destination terminal are deleted from the table in the routing control cache 107, causing the network to forget the routes shown in FIG. 6. If communication with terminal D resumes later, new routes can be established by repeating the flooding procedure described above with another route request message and reply.

In the first embodiment, if a packet without a specified destination terminal is received, it is transferred to all neighboring terminals having IDs held in the neighboring terminal ID storage unit 106.

The first embodiment provides a simple scheme by which multiple paths between two terminals in an ad hoc network can be selected and maintained for a specified time automatically, using information held in the path control caches of the participating terminals. Compared with conventional single-path routing schemes, the first embodiment improves communication stability by allowing redundant routes to be used. Compared with conventional multipath routing schemes, the first embodiment requires less path management processing, since each terminal only has to store terminal IDs of received packets and decrement the relay and retention times in its neighboring terminal ID storage unit and routing control cache. A particular advantage of the first embodiment is that it does not require any distance calculations, and does not require use of a satellite-based positioning system such as the Global Positioning System (GPS). The first embodiment accordingly leaves the communication terminals unburdened by complex routing overhead and able to make efficient use of their computational and other resources.

Second Embodiment

Figure 7:
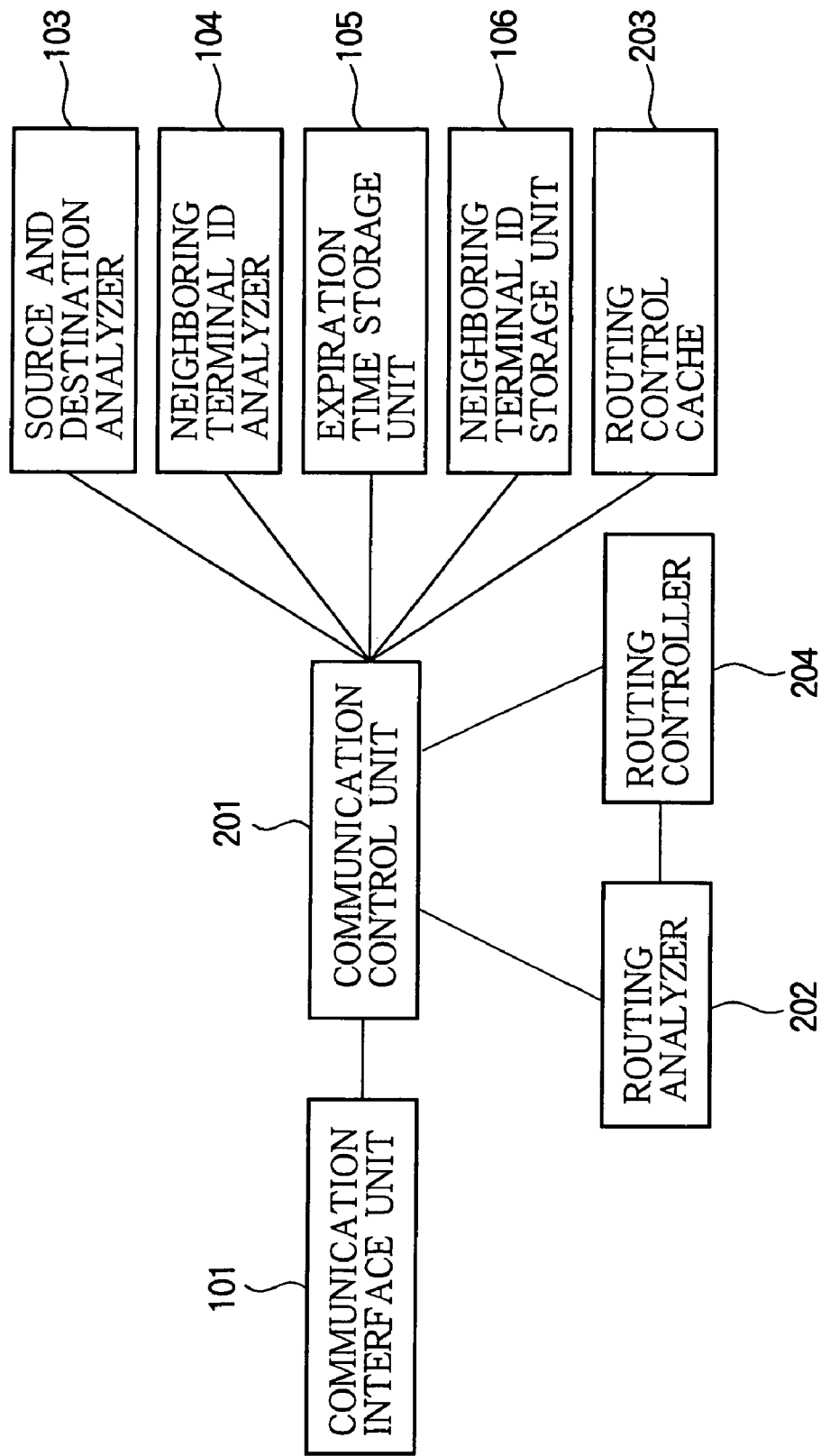
FIG. 7 is a block diagram of a communication terminal in a second-embodiment of the invention.

Referring to FIG. 7, the communication terminals in the second embodiment have a communication interface unit 101, a communication control unit 201, a source and destination analyzer 103, a routing analyzer 202, a neighboring terminal ID analyzer 104, an expiration time storage unit 105, a neighboring terminal ID storage unit 106, a routing control cache 203, and a routing controller 204, which are interconnected as shown.

The communication interface unit 101 interfaces with other communication terminals in the network.

The communication control unit 201 receives packets from the communication network and sends packets to the communication network via the communication interface unit 101. Among the packets sent to the communication network are route command message packets supplied by the routing controller 204.

The communication control unit 201 sends received packets to the source and destination analyzer 103, neighboring terminal ID analyzer 104, and routing analyzer 202, receives the IDs of the source and destination terminals of the packets from the source and destination analyzer 103, and receives the IDs of neighboring terminals from the neighboring terminal ID analyzer 104.

The communication control unit 201 sends relay time and retention time requests to the expiration time storage unit 105 and receives predetermined initial values of the relay and retention times from the expiration time storage unit 105. A relay time indicates the time for which information is held in the routing control cache 203. A retention time indicates the time for which the IDs of neighboring terminals are held in the neighboring terminal ID storage unit 106.

The communication control unit 201 sends the neighboring terminal ID storage unit 106 sets of information including neighboring terminal IDs obtained from the neighboring terminal ID analyzer 104 and initial retention time values obtained from the expiration time storage unit 105.

The communication control unit 201 sends the routing control cache 203 sets of information including a pair of endpoint terminal IDs obtained from the routing controller 204 and the initial relay time value obtained from the expiration time storage unit 105. The relay terminal IDs indicate a pair of terminals between which packets are to be routed.

The communication control unit 201 may also query the routing control cache 203 as to whether it holds the source terminal ID and destination terminal ID of a received packet as a pair of endpoint terminal IDs. If the source terminal ID and destination terminal ID are so held in the routing control cache 203, the communication control unit 201 then requests all neighboring terminal IDs held in the neighboring terminal ID storage unit 106, and transfers (relays) the received packet via the communication interface unit 101 to all neighboring terminals with IDs returned from the neighboring terminal ID storage unit 106. If the routing control cache 203 does not hold the requested source terminal ID and destination terminal ID as a pair of endpoint terminal IDs, the communication control unit 201 does not transfer the received packet.

The source and destination analyzer 103 analyzes received packets to obtain their source terminal IDs and destination terminal IDs, and sends these IDs to the communication control unit 201.

The neighboring terminal ID analyzer 104 analyzes received packets to obtain the IDs of the neighboring terminals from which the packets have been received, and sends the neighboring terminal IDs to the communication control unit 201.

The expiration time storage unit 105 holds predetermined initial values of the relay time and retention time and sends these initial values to the communication control unit 201 when so requested.

The neighboring terminal ID storage unit 106 has a table storing data as shown in FIG. 2. Each entry in the table includes a neighboring terminal ID that has been received from the communication control unit 201, and an associated retention time. The values of the retention times are decremented from the initial value toward zero as in the first embodiment. When the neighboring terminal ID storage unit 106 receives a new set of information, if the neighboring terminal ID in the received information is not present in the table, the neighboring terminal ID storage unit 106 adds the information to the table as a new entry; if the neighboring terminal ID is already present in an existing entry in the table, the received information is overwritten on the existing entry, restoring the retention time of the entry to the initial value. When the retention time value of an entry reaches zero, the entry is deleted from the table. When requested by the communication control unit 201 to return neighboring terminal IDs, the neighboring terminal ID storage unit 106 sends all neighboring terminal IDs in the table to the communication control unit 201.

The routing analyzer 202 determines whether a packet received from the communication control unit 201 includes a route request flag or a route command flag. These flags indicate whether the packet is a route request message packet or a route command message packet. If the received packet includes a route request flag, the routing analyzer 202 analyzes the message in the packet to obtain route request information and the IDs of two endpoint terminals (which will be source and destination terminals in future communication), and sends the route request information and the IDs of the two endpoint terminals to the routing controller 204. If the received packet includes a route command flag, the routing analyzer 202 analyzes the message in the packet to obtain the IDs of two endpoint terminals, and sends these IDs to the routing controller 204.

The routing controller 204 sends the communication control unit 201 the IDs of the two endpoint terminals received from the routing analyzer 202. When the routing controller 204 receives route request information from the routing analyzer 202, it also generates a route command message packet and sends the route command message packet to the communication control unit 201.

The routing control cache 203 has a table as shown in FIG. 8. Each entry in the table consists of two endpoint terminal IDs received from the communication control unit 201, and a relay time that is decremented from the initial value toward zero as time elapses. When the routing control cache 203 receives a new set of information, if the two endpoint terminal IDs in the received information are not present in the table, the routing control cache 203 adds the received information as a new entry to the table. If the endpoint terminal IDs in the received information are already present in the table, the received information is overwritten on the existing entry in the table, restoring the relay time of the entry to the initial value. When the relay time of an entry reaches zero, the entry is deleted from the table.

The routing control cache 203, if queried from the communication control unit 201 as to whether it holds the source terminal ID and the destination terminal ID of a received packet, returns a reply indicating whether these IDs are present in a single entry in the table.

Operations of the communication terminal and communication network in the second embodiment will be described below with reference to FIGS. 7 to 11. The circles in FIGS. 9 to 11 indicate communication terminals constituting the communication network. The description below concerns communication between the terminals marked S and D.

First, terminal S selects one path for communication with terminal D, as shown in FIG. 9. The path can be selected by, for example, a conventional single-path routing method.

Next, terminal S selects a terminal M at about the midpoint position on the selected path between terminals S and D, as shown in FIG. 9. Terminal M may be selected according to the number of hops (the hopcount) on the path from S to D, for example.

Terminal S also determines a hopcount r as follows:

$r = $ (integer part of ((hopcount from $S$ to $D$)/2)+1)

In FIG. 9, r is equal to four. Terminal S sends terminal M a route request message packet (a packet with a route request flag) with information including this hopcount (r) and the IDs of terminals S and D as endpoint terminals. The route request message commands terminal M to relay future packets that may be transmitted between these endpoint terminals S and D, and to transmit route command packets with a similar command to terminals located within r hops of terminal M.

When terminal M receives the route request message packet from terminal S, its routing analyzer 202 analyzes the route request information in the packet, its routing controller 204 generates a route command message packet (a packet with a route command flag) asking for relay of future communication between terminals S and D, and its communication control unit 201 sends the route command packet to terminals within r (4) hops of terminal M.

The result is shown in FIG. 10. The numerals in FIGS. 10 and 11 indicate hopcounts from terminal M.

Terminal M also writes the IDs of the two endpoint terminals (terminals S and D) that have been obtained from analysis of the route request message packet by the routing analyzer 202 as an entry in the table held in the routing control cache 203, together with the initial relay time.

Each terminal within four hops of terminal M receives the route command message packet from terminal M, and writes the IDs of the two endpoint terminals (terminals S and D) obtained by analysis of the route command message by the routing analyzer 202 in its routing control cache 203, together with the initial relay time value.

Figure 11:
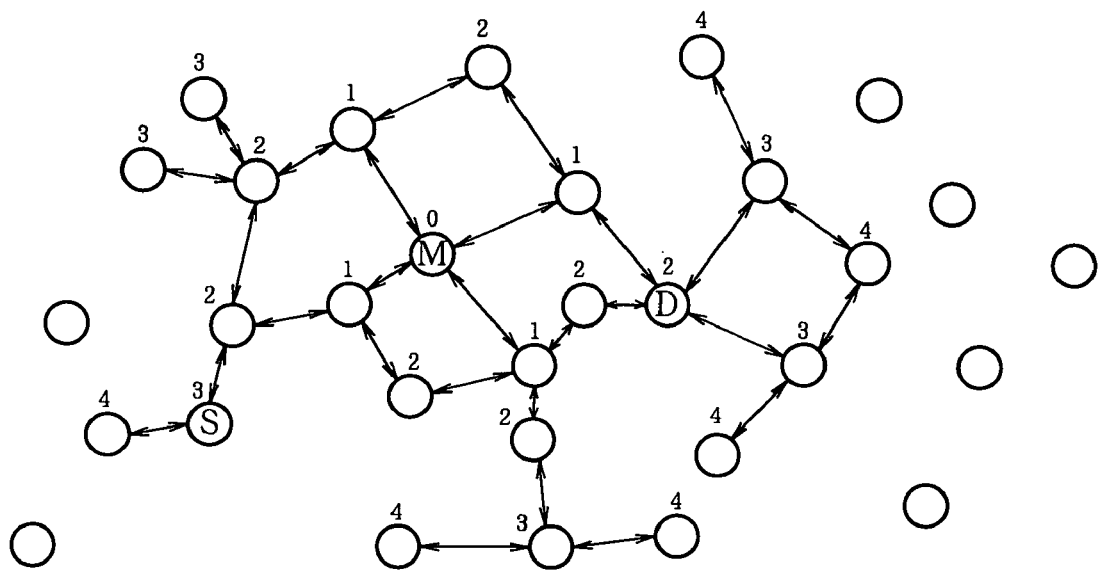

In this procedure, since only terminal M and terminals within four hops of terminal M write the IDs of the two endpoint terminals (terminals S and D) and the initial relay value in their routing control cache 203, only these terminals attempt to relay communications between terminals S and D, enabling automatic selection of a plurality of paths as shown in FIG. 11 for sending packets from terminal S to terminal D. The same paths are also used for sending packets from terminal D to terminal S.

As described above, the second embodiment provides a simple routing scheme by which multiple paths between two terminals in an ad hoc network can be selected and maintained for a specified time automatically, using information held in the routing control caches of the participating terminals. Compared with conventional single-path routing schemes, the second embodiment improves communication stability by providing redundant routes. Compared with conventional multipath routing schemes, the second embodiment requires less path management processing, because when a source terminal sends a route request message to set up a link to a destination terminal, it only has to select one path and one terminal at or near the midpoint of the selected path. Redundant paths are then set up automatically by transmission of route command messages. This procedure does not require complex distance calculations or the use of a global positioning system. The second embodiment accordingly leaves the communication terminals unencumbered by complex routing overhead and able to make efficient use of their computational and other resources.

In a variation of the second embodiment, after the source terminal S designates a single path as in FIG. 9, the destination terminal D, instead of the source terminal S, selects a terminal M near the midpoint of the path and sends a route request message to terminal M. Alternatively, both the source terminal S and the destination terminal D may select a terminal on the designated path and send a route request message to the selected terminal; in this case two different terminals may receive route request messages and send out route command messages. As another alternative, a terminal M may recognize its position at or near the midpoint of the selected path and send out route command messages on its own, without having to receive a route request message.

Figure 12:
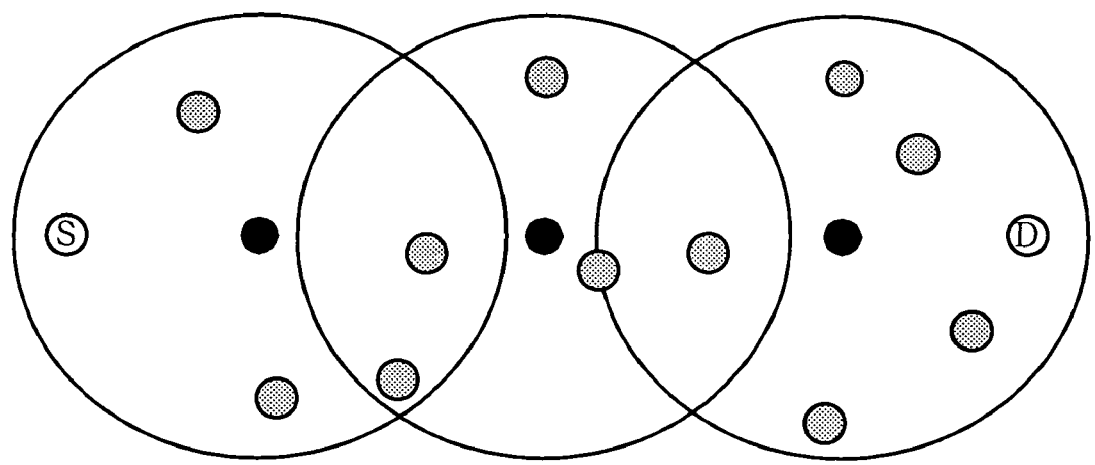
FIG. 12 illustrates another communication network in the second embodiment of the invention.

If the source and destination terminals S and D are widely separated, it is also possible to select a plurality of terminals spaced out on the selected path and send route request messages to each of these terminals. In FIG. 12, for example, route request messages may be sent to the three terminals indicated by black circles, each of which proceeds to send route command messages to terminals within a designated hopcount distance of itself, as indicated by the large circles in FIG. 12. As a result, communication between terminals S and D is relayed by the three terminals indicated by black circles and the ten terminals indicated by gray circles. Routes are thereby restricted to a roughly oblong area, conserving network resources.

Third Embodiment

Figure 13:
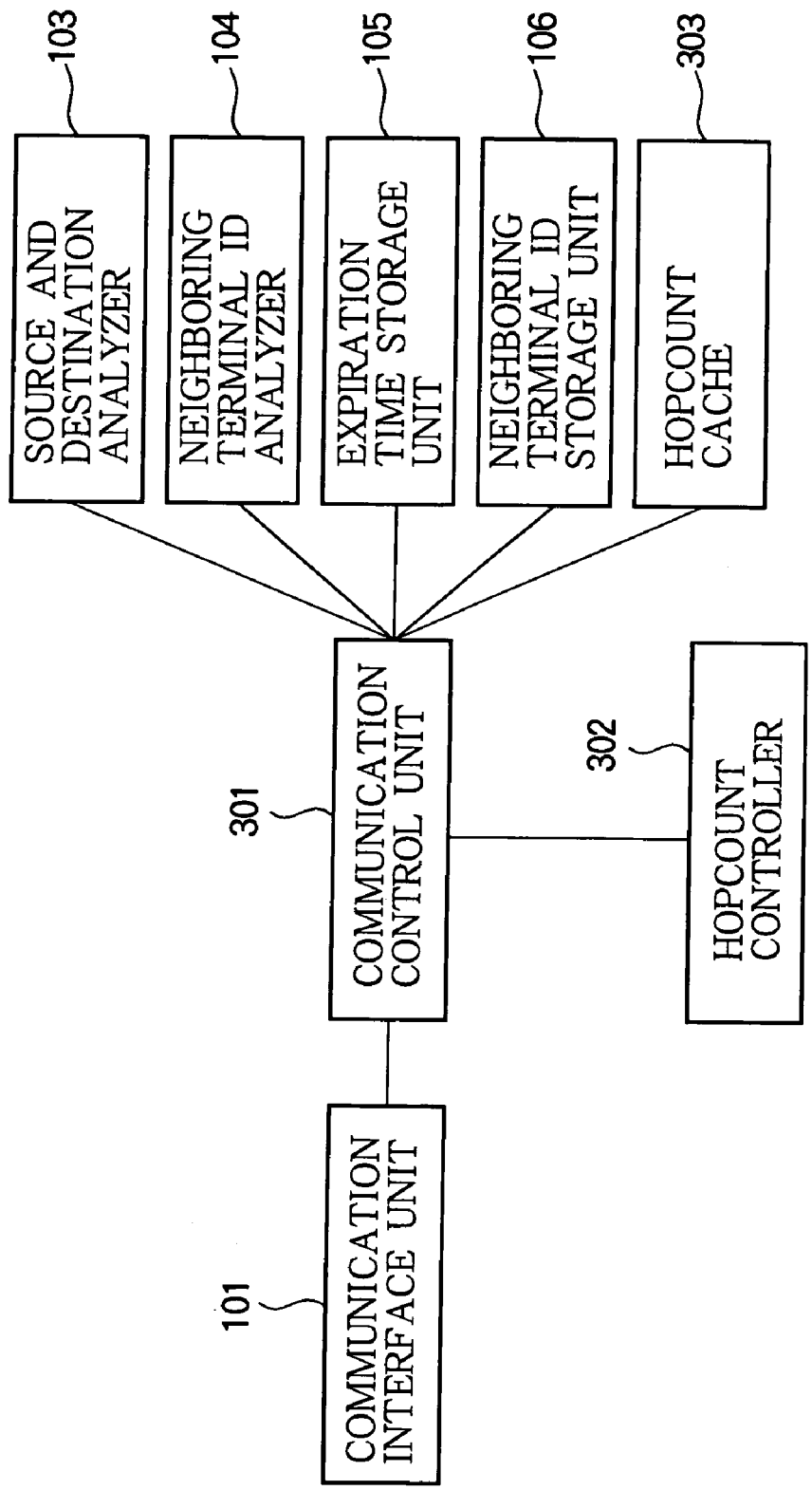
FIG. 13 is a block diagram of a communication terminal in a third embodiment of the invention.

Referring to FIG. 13, the communication terminals in the third embodiment have a communication interface unit 101, a communication control unit 301, a source and destination analyzer 103, a neighboring terminal ID analyzer 104, an expiration time storage unit 105, a neighboring terminal ID storage unit 106, a hopcount controller 302, and a hopcount cache 303, which are interconnected as shown.

The communication interface unit 101 interfaces with other communication terminals in the network.

The communication control unit 301 receives packets from the communication network via the communication interface unit 101, and transmits packets to the communication network. The packets in the third embodiment include a pair of hopcount values indicating the number of hops from the source terminal and the number of hops to the destination terminal. Among the packets received from the network are route request message packets. The communication control unit 301 sends all received packets to the source and destination analyzer 103, neighboring terminal ID analyzer 104, and hopcount controller 302, receives the IDs of the source and destination terminals of the packets from the source and destination analyzer 103, receives the IDs of neighboring terminals from the neighboring terminal ID analyzer 104, and receives hopcount values and packets with updated hopcount values from the hopcount controller 302.

The communication control unit 301 sends relay time and retention time requests to the expiration time storage unit 105 and receives predetermined initial values of the relay and retention times from the expiration time storage unit 105. A relay time indicates the time for which information is held in the hopcount cache 303. A retention time indicates the time for which the IDs of neighboring terminals are held in the neighboring terminal ID storage unit 106.

The communication control unit 301 receives neighboring terminal IDs that have been obtained from the neighboring terminal ID analyzer 104 and initial retention time values received from the expiration time storage unit 105 to the neighboring terminal ID storage unit 106.

When the communication control unit 301 sends a received packet to the hopcount controller 302, it normally receives in return the updated hopcounts indicating the number of hops from the source terminal and the number of hops to the destination terminal of the packet, and an updated copy of the packet including these updated hopcount values. If the packet is a route request message packet, however, the communication control unit 301 receives only the updated packet and the updated hopcount indicating the number of hops from the source terminal.

The communication control unit 301 sends the hopcount cache 303 sets of information including a destination terminal ID, a hopcount to the destination terminal, and an initial relay time value. The destination terminal ID has been analyzed by the source and destination analyzer 103 as the source terminal ID of a route request message packet. The hopcount to the destination terminal has been analyzed by the hopcount controller 302 as a hopcount from the source terminal of a route request message packet.

The communication control unit 301 also queries the hopcount cache 303 as to whether it holds the destination terminal ID of a received packet, as obtained by the source and destination analyzer 103. If the destination terminal ID is held in the hopcount cache 303, the communication control unit 301 requests the hopcount held in association with the destination terminal ID, and compares the hopcount value returned by the hopcount cache 303 with the hopcount to the destination terminal of the received packet, as obtained by the hopcount controller 302. If the hopcount value returned by the hopcount cache 303 is equal to or less than the hopcount value to the destination terminal returned by the hopcount controller 302, the communication control unit 301 requests all neighboring terminal IDs held in the neighboring terminal ID storage unit 106, and transfers the updated version of the packet, in which the hopcount value to the destination terminal has been decremented by one and the hopcount value from the source terminal has been incremented by one by the hopcount controller 302, to all neighboring terminals with IDs returned from the neighboring terminal ID storage unit 106. If the hopcount value returned by the hopcount cache 303 is greater than the hopcount value returned by the hopcount controller 302, or if the destination terminal ID of the received packet is not present in the hopcount cache 303, the communication control unit 301 does not transfer the received packet.

The source and destination analyzer 103 analyzes received packets to obtain their source terminal IDs and destination terminal IDs, and sends these IDs to the communication control unit 301.

The neighboring terminal ID analyzer 104 analyzes received packets to obtain the IDs of the neighboring terminals from which the packets have been received, and sends the neighboring terminal IDs to the communication control unit 301.

The expiration time storage unit 105 holds predetermined initial values of the relay time and retention time and sends these initial values to the communication control unit 301 when so requested.

The neighboring terminal ID storage unit 106 has a table storing data as shown in FIG. 2. Each entry in the table includes a neighboring terminal ID that has been received from the communication control unit 301, and an associated retention time. The values of the retention times are decremented from the initial value toward zero as in the first embodiment. When the neighboring terminal ID storage unit 106 receives a new set of information, if the neighboring terminal ID in the received information is not present in the table, the neighboring terminal ID storage unit 106 adds the information to the table as a new entry; if the neighboring terminal ID is already present in an existing entry in the table, the received information is overwritten on the existing entry, restoring the retention time of the entry to the initial value. When the retention time value of an entry reaches zero, the entry is deleted from the table. When requested by the communication control unit 201 to return neighboring terminal IDs, the neighboring terminal ID storage unit 106 sends all neighboring terminal IDs in the table to the communication control unit 301.

The hopcount controller 302 analyzes route request message packets received from the communication control unit 301 to obtain the hopcount from the source terminal, and sends this hopcount value to the communication control unit 301. The hopcount controller 302 analyzes other packets received from the communication control unit 301 to obtain both the hopcount to the destination terminal and the hopcount from the source terminal, generates packets with the hopcount value to the destination terminal decremented by one from the corresponding value in the received packet and the hopcount from the source terminal incremented by one from the corresponding value in the received packet, and sends the two hopcount values and the generated packet to the communication control unit 301.

The hopcount cache 303 has a table as shown in FIG. 14, in which an entry which consists of a destination terminal ID, the hopcount to the destination terminal, and the initial relay time that has been received from the communication control unit 301. The relay time values held in the hopcount cache 303 are decremented from the initial value toward zero as in the first embodiment. When the hopcount cache 303 receives a new set of information, if the destination terminal ID in the received information is not present in the table, the hopcount cache 303 adds the received information as a new entry to the table. If the destination terminal ID in the received information is already present in the table, and the hopcount in the received information is equal to or less than the corresponding hopcount in the table, the received information is overwritten on the existing entry in the table, restoring the relay time of the entry to the initial value. When the relay time of an entry reaches zero, the entry is deleted from the table.

The hopcount cache 303, if queried from the communication control unit 301 as to whether it holds a destination terminal ID or not, returns a reply indicating whether the destination terminal ID is present in the table; if requested by the communication control unit 301 to return the hopcount associated with the destination terminal ID, it returns the hopcount.

Operations of the communication terminal and communication network in the third embodiment will be described below with reference to FIGS. 13 to 16. The circles in FIGS. 15 and 16 indicate communication terminals constituting the communication network. The description below concerns communication between the terminals marked S and D.

To initiate communication, terminal D sends a packet including a route request message to all other terminals in the network, using a flooding method.

In each terminal that receives a packet with the route request message from terminal D, the source terminal ID (the ID of terminal D) and the destination terminal ID (the ID of terminal S) included in the received packet are analyzed by the source and destination analyzer 103 and the ID of neighboring terminal from which the packet was directly received is analyzed by the neighboring terminal ID analyzer 104; the hopcount from the source terminal of the received packet is analyzed by the hopcount controller 302.

The information is written as an entry in the hopcount cache 303 with the analyzed source terminal ID as the destination terminal ID, the analyzed hopcount from the source terminal as the hopcount to the destination terminal, and the initial relay time value that is held in the expiration time storage unit 105.

At this point, each terminal that has received the packet including the route request message knows its hopcount distance to (from) terminal D, and has stored this hopcount in the hopcount cache 303 as a hopcount to a destination terminal. These hopcount values are indicated as the numerical values beside the circles in FIGS. 15 and 16.

Terminal S also receives the route request message packet. In communication with terminal D, terminal S queries the hopcount cache 303 for the hopcount value to the destination terminal (terminal D), generates a packet that includes information giving the hopcount value to the destination terminal (terminal D) returned from the hopcount cache 303 as the hopcount value to the destination terminal and the hopcount value from the source terminal as zero (0), and sends this packet to its neighboring terminals.

Each terminal that receives the packet from terminal S analyzes the hopcount value to the destination terminal (terminal D) and the hopcount value from the source terminal (terminal S); queries the hopcount cache 303 for the hopcount value to the destination terminal (terminal D), and if the value returned from the hopcount cache 303 is less than the analyzed hopcount value to the destination terminal (terminal D), generates a packet with a hopcount value to the destination terminal decremented by one from the corresponding value in the received packet and a hopcount value from the source terminal incremented by one from the corresponding value in the received packet, and sends a packet that includes the two updated hopcount values to its neighboring terminals; if the value returned from the hopcount cache 303 is greater than the analyzed hopcount value to the destination terminal (terminal D), it abandons the packet; if the value returned from the hopcount cache 303 equals the analyzed hopcount value to the destination terminal (terminal D), it transfers the received packet to its neighboring terminals with the hopcount values unchanged.

This procedure, in which all terminals that receive packets originating from terminal S route them as described above, enables automatic selection of multiple paths as shown in FIG. 16 by which packets can reach the destination terminal D. A similar procedure is used to route packets from terminal D to terminal S.

As described above, the third embodiment provides a simple routing scheme in which a packet is relayed as long as the hopcount to the destination terminal has not increased as a result of the preceding hop, as determined by comparing the hopcount in the packet with hopcount data stored by each terminal in a hopcount cache. This scheme allows a packet to be relayed by multiple routes, thereby improving communication stability as compared with conventional single-path routing schemes. The third embodiment does not, however, require complex distance calculations or other procedures for setting up the multiple routes; the routes are set up automatically, simply by having the destination terminal flood the network with route request message packets so that other communication terminals can determine their hopcount distances from the destination terminal. Furthermore, the third embodiment does not require the use of a global positioning system. The communication terminals in the third embodiment, like the communication terminals in the preceding embodiments, are left unburdened by complex routing overhead and able to make efficient use of their computational and other resources.

In a variation of the third embodiment, the communication control unit 301 abandons a received packet if the hopcount to the destination terminal obtained by the hopcount controller 302 is equal to the hopcount to the destination terminal stored in the hopcount cache 303. In this variation, packets are routed only on paths in which the hopcount to the destination decreases by one at every hop.

Fourth Embodiment

The fourth embodiment allows a communication terminal that is moving while transmitting and receiving packets to detect its motion and transmit the information to neighboring terminals, thereby enabling the communication network to respond to changes in communication paths caused by the motion.

Figure 17:
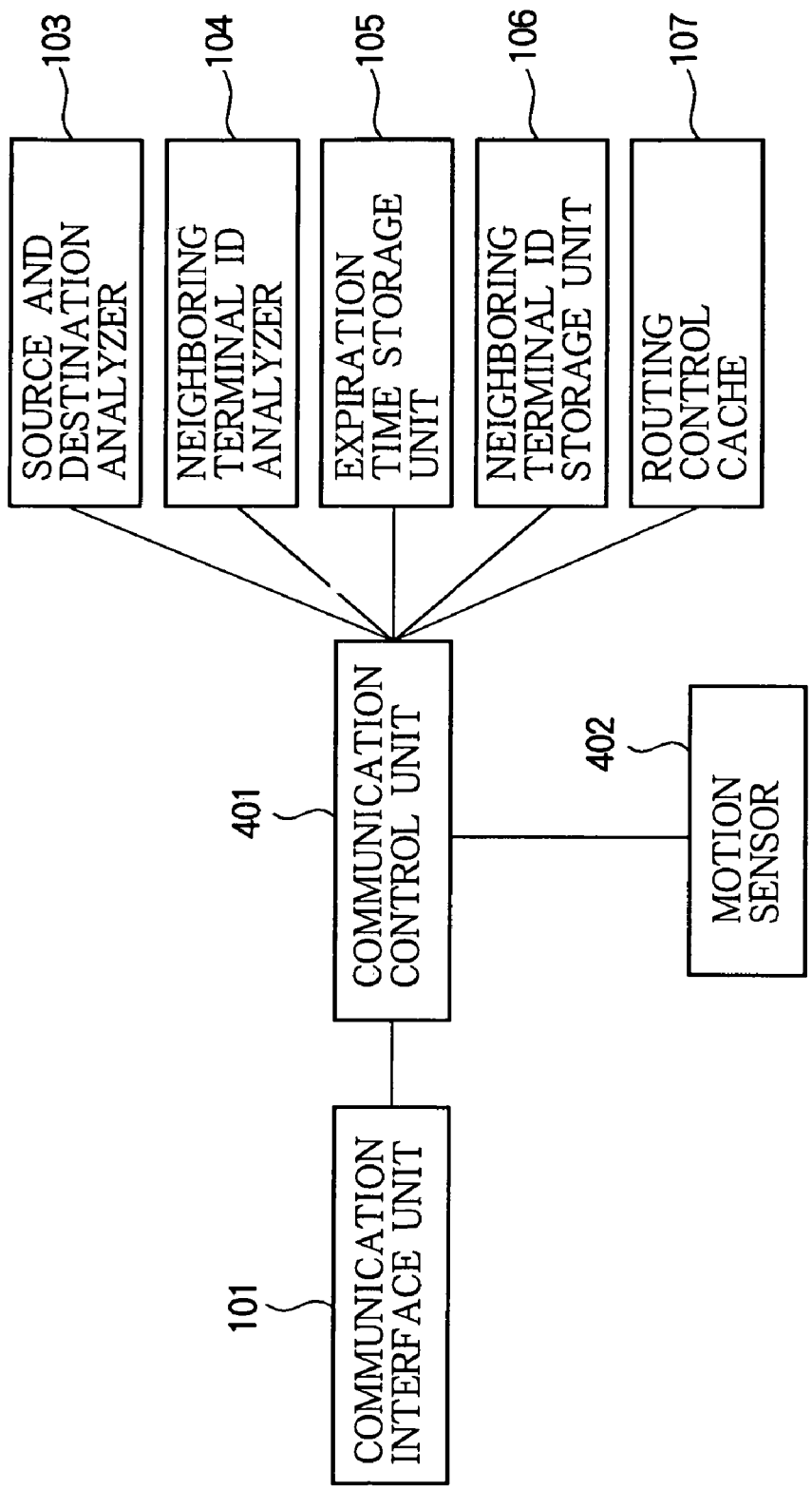
FIG. 17 is a block diagram of a communication terminal in a fourth embodiment of the invention.

Referring to FIG. 17, the communication terminals in the fourth embodiment have a communication interface unit 101, a communication control unit 401, a source and destination analyzer 103, a neighboring terminal ID analyzer 104, an expiration time storage unit 105, a neighboring terminal ID storage unit 106, a routing control cache 107, and a motion sensor 402, which are interconnected as shown. The communication terminal shown in FIG. 17 has the same structure as the communication terminal in the first embodiment shown in FIG. 1, except that the communication control unit 401 is altered and the motion sensor 402 is added.

The motion sensor 402 detects oscillation or acceleration force, thereby recognizing the motion of the terminal, and sends the information to the communication control unit 401. Examples of devices that can be used as the motion sensor 402 include an oscillation sensor by which motion is detected from the inclination of a pendulum, and a velocimeter capable of computing motion velocities.

The communication control unit 401 provides the functions of the communication control unit 102 in the first embodiment in FIG. 1, and additional functions adapted for the motion sensor 402.

Operations of the communication terminal and communication network will be described below. The description will concentrate on the operations of the communication control unit 401 and the motion sensor 402; descriptions of operations that are the same as in the first embodiment will be omitted.

When the motion sensor 402 detects motion of the terminal and informs the communication control unit 401 of the motion, the communication control unit 401 transmits to nearby terminals (each of the neighboring terminals with IDs that are held in the neighboring terminal ID storage unit 106 in the terminal, and/or terminals within an arbitrary hopcount distance from these neighboring terminals) a packet having an ID deletion request message via the communication interface unit 101. The ID deletion request message notifies the nearby terminals that motion has been detected and requests deletion of the moving terminal's ID.

When the ID deletion request message packet is received via the communication interface unit 101, the communication control unit 401 in each of the nearby terminals (each of the neighboring terminals with IDs that are held in the neighboring terminal ID storage unit 106 in the terminal, and/or terminals within an arbitrary hopcount distance from these neighboring terminals) deletes the ID of the source terminal of the ID deletion request message packet from the list of neighboring terminal IDs held in the neighboring terminal ID storage unit 106 and/or the list of relay terminal IDs held in the routing control cache 107.

As described above, the communication terminal in the fourth embodiment detects its own motion and reports it to the nearby terminals, so that the motion of a relay terminal triggers a change in relay paths, avoiding waste such as transmitting packets to non-existing neighboring terminals, resulting in reduced delay of packets.

Fifth Embodiment

The fifth embodiment deals with the case in which a communication terminal is moving together with nearby terminals while transmitting and receiving packets and enables the communication terminals to exchange information about their velocities and directions of motion, thereby enabling the communication network to respond appropriately to the coordinated motion of a group of terminals.

Figure 18:
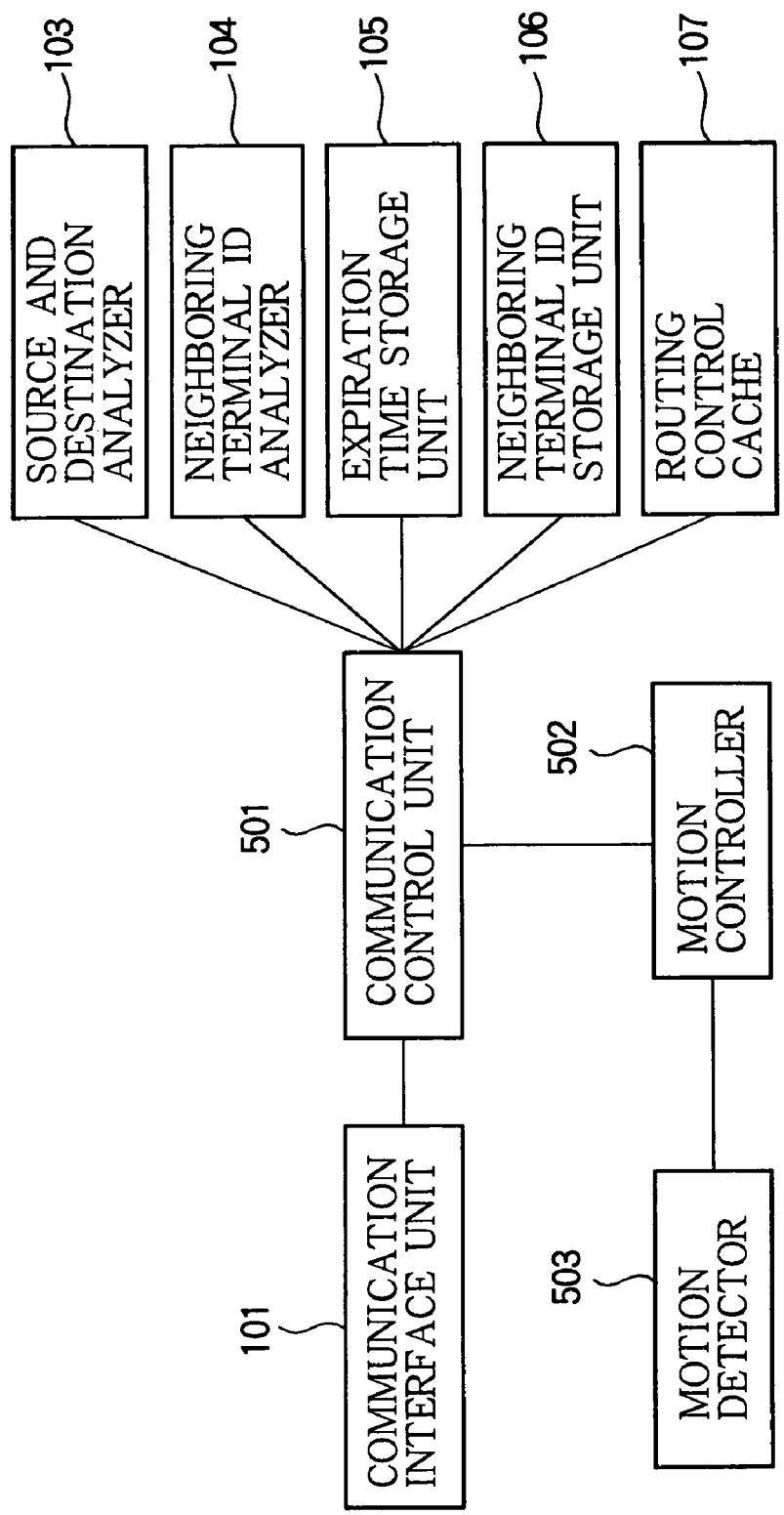
FIG. 18 is a block diagram of a communication terminal in a fifth embodiment of the invention.

Referring to FIG. 18, the communication terminals in the fifth embodiment have a communication interface unit 101, a communication control unit 501, a source and destination analyzer 103, a neighboring terminal ID analyzer 104, an expiration time storage unit 105, a neighboring terminal ID storage unit 106, a routing control cache 107, a motion controller 502, and a motion detector 503, which are interconnected as shown. The communication terminal shown in FIG. 18 has the same structure as in the first embodiment shown in FIG. 1, except that the motion controller 502 and the motion detector 503 are added and the communication control unit 501 is altered.

The motion detector 503 detects the velocity and direction of motion of the terminal and sends the information to the motion controller 502. Examples of devices usable as the motion detector 503 include a GPS device that can detect velocity and direction of motion.

Figures 19, 20:
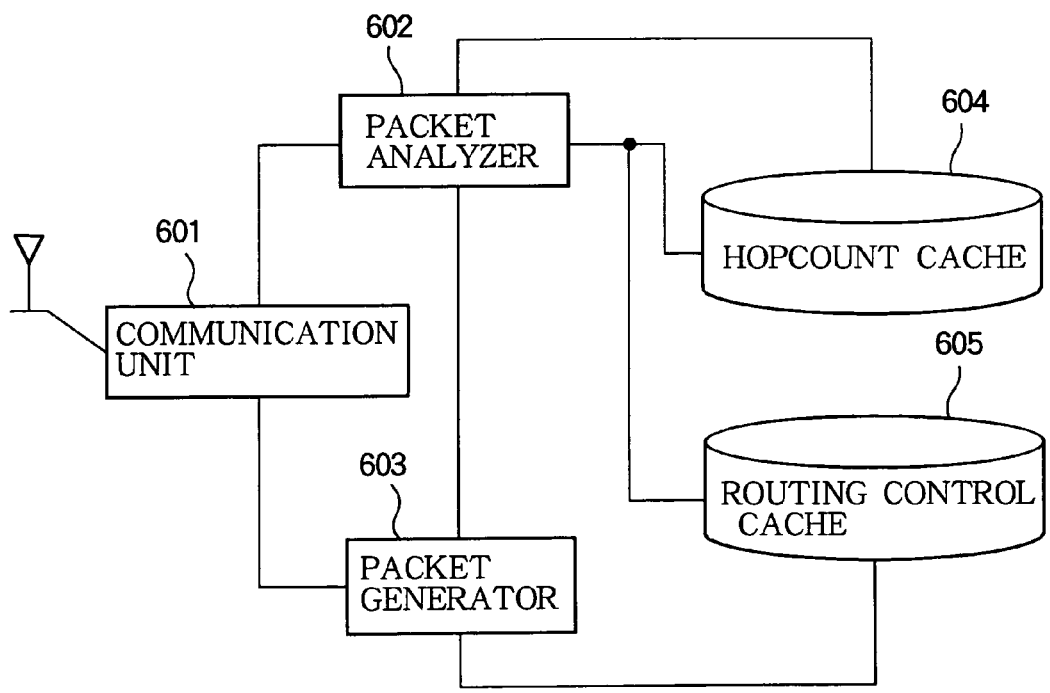
FIG. 19 illustrates exemplary data stored in the motion controller in FIG. 18.
FIG. 20 is a block diagram of a communication terminal in a sixth embodiment of the invention.

The motion controller 502 has a control table with entries as shown in FIG. 19, giving the velocity and direction of motion of the terminal itself as obtained by the motion detector 503, and velocities and directions of motion of other nearby terminals, which are obtained from motion reporting message packets received via the communication interface unit 101. Each entry in the table includes a terminal ID, the velocity of the terminal, and a direction vector giving the direction of motion. The direction vector is an ordered pair of numbers (x, y) in which, for example, east corresponds to the positive x-direction and north to the positive y-direction.

The motion controller 502 also sends the velocity and direction of motion of the terminal as obtained by the motion detector 503 to the communication control unit 501 to be transmitted to nearby terminals.

The motion controller 502 calculates relative velocities (differences in velocity and direction of motion) between its own terminal and other nearby terminals, finds nearby terminals having large differences (more than a predetermined value) in velocity and direction of motion, sends the IDs of those nearby terminals to the communication control unit 501, and deletes their IDs from the control table shown in FIG. 19.

The communication control unit 501 corresponds to the communication control unit 102 (FIG. 1) in the first embodiment, with additional functions adapted for the motion controller 502 and the motion detector 503.

Operations of the communication terminal and the communication network in the fifth embodiment will be described below. The description will concentrate on the operations of the communication control unit 501, motion detector 503, and motion detector 503; descriptions of operations similar to operations in the first embodiment will be omitted.

When the motion controller 502 receives information about the velocity and direction of motion of its own terminal from the motion detector 503, it writes the information in the control table shown in FIG. 19 and sends the information to the communication control unit 501.

The communication control unit 501 transmits the information about the velocity and direction of motion of the terminal as a motion notification message packet via the communication interface unit 101 to nearby terminals (neighboring terminals having IDs held by the neighboring terminal ID analyzer 104 and/or terminals within an arbitrary hopcount distance from these neighboring terminals).

The communication control unit 501 in each of the nearby terminals that receives the motion notification message packet sends the received packet to the motion controller 502. The motion controller 502 analyzes the packet to obtain information about velocity and direction of motion of a nearby terminal, and writes the information in the control table shown in FIG. 19.

The motion controller 502 also determines the difference in velocity and direction of motion between its own terminal and the nearby terminal; if the difference is smaller than a predetermined value, the motion controller 502 leaves the ID of the neighboring terminal in its control table; if the difference is greater than the predetermined value, the motion controller 502 deletes the ID of the nearby terminal from its control table and sends the deleted ID to the communication control unit 501. The communication control unit 501 then deletes the same ID from the table of neighboring terminal IDs held by the neighboring terminal ID storage unit 106, if the ID is present in the table in the neighboring terminal ID storage unit 106.

The exemplary control table data shown in FIG. 19 indicate that the terminal in which this control table is stored is moving with approximately the same velocity and direction of motion as terminal M, so the ID of terminal M is left in the control table. Terminal Q is determined to be stationary, and its ID is deleted from the control table in FIG. 19 and the neighboring terminal ID storage unit 106.

As described above, the fifth embodiment allows nearby terminals to exchange information about their velocity and direction of motion, thereby detecting their relative motion. Compared with the first embodiment, the fifth embodiment eliminates wasteful attempts to relay packets between terminals that are no longer neighbors because they are moving at different velocities or in different directions. Compared with the fourth embodiment, the fifth embodiment eliminates the wasteful deletion of IDs of terminals that are moving but remain nearby because their relative motion is small, enabling communication to continue without interruption in a group of terminals that are moving together. In addition, communication with terminals external to the moving group can be routed through just one of the terminals at the periphery of the moving group, resulting in reduced waste of communication network resources.

Sixth Embodiment

The sixth embodiment forms multiple communication paths between a source terminal and a destination terminal by having each terminal in the network determine its hopcount from the source terminal and its hopcount from the destination terminal, and relay packets between these two terminals if the sum of the two hopcounts (the total hopcount on the shortest route through the terminal) is equal to or less than a ceiling value specified by the source terminal. This scheme allows routes to be spread out to a greater extent than in conventional routing schemes, in order to balance the load on the participating terminals, especially in the areas around the source and destination terminals.

The sixth embodiment constructs multiple paths for communication between a source terminal and a destination terminal in the following steps 1 to 4.

(Step 1) In order to confirm that communication is possible between the source terminal and the destination terminal, the source terminal advertises its presence by the flooding method and requests communication with the destination terminal. This advertisement enables each terminal in the network to obtain its minimum hopcount distance (s) from the source terminal.

(Step 2) The destination terminal, which receives the data transmitted by the flooding method from the source terminal, also advertises its presence by the flooding method, thereby replying to the source terminal. This advertisement enables each terminal in the network to obtain its minimum hopcount distance (d) from the destination terminal.

(Step 3) The flooding transmission and receiving operations in steps 1 and 2 enable the source and destination terminals to confirm that they can communicate with each other and to obtain the minimum hopcount distance (n) between them. Each other terminal in the network obtains a total hopcount value (s+d=h), also referred to below as a route hopcount, indicating the number of hops on the shortest path that can be routed through it. The shortest path (the optimal path) between the source and destination terminals is made up of terminals with a route hopcount equal to the minimum value (h=n).

(Step 4) The source terminal allows only terminals with a route hopcount (h) that exceeds n by at most a certain quantity a (terminals meeting the condition h≦n+a) to relay communication between the source and destination terminals. This means that packets will be routed on paths with hopcounts up to n+a, where a is an integer within a range from zero to a maximum limit value α (0<a≦α)

Steps 1 to 4 form multiple paths having a hopcount length (h) equal to or less than a value (n+a) set by the source terminal.

As described above, both the source terminal and the destination terminal advertise their presence by using the flooding method, enabling each terminal in the network to obtain a hopcount (s) from the source terminal and a hopcount (d) from the destination terminal, and to obtain the hopcount (h=s+d) of the shortest path it can route. Routing control can therefore be carried out by using these hopcount values (s, d, h) and setting a hopcount ceiling value (n+a) at the source terminal.

Referring to FIG. 20, the communication terminals in the sixth embodiment have a communication unit 601, a packet analyzer 602, a packet generator 603, a hopcount cache 604, and a routing control cache 605.

The communication unit 601 performs wireless communication with other terminals in the network, transmitting and receiving packets. The functions performed by the communication unit 601 include the functions of the communication interface unit 101 in the preceding embodiments.

The packet analyzer 602 analyzes packets received by the communication unit 601 and carries out various routing functions. The functions performed by the packet analyzer 602 include the functions of the source and destination analyzer and neighboring terminal ID analyzer and some of the functions of the communication control unit in the preceding embodiments. More specifically, the packet analyzer 602 performs the following four processes (a to d).

a) The packet analyzer 602 analyzes a packet received by the communication unit 601 to obtain the source address and the hopcount from the source address to the terminal. The source address is sent to the hopcount cache 604 as the ID of the source terminal. The hopcount is sent to the hopcount cache 604 as the hopcount from the terminal with the source address. The hopcount cache 604 holds the received terminal ID and the hopcount for a certain period of time.

b) The packet analyzer 602 analyzes a packet received by the communication unit 601 to obtain the source address, the ID of the neighboring terminal from which the packet was received, and the ID of the packet (a sequence number or other information that can identify the packet). The source address is sent to the routing control cache 605 as a destination terminal ID. The neighboring terminal ID is sent to the routing control cache 605 as a neighboring relay terminal ID. The packet ID is also sent to the routing control cache 605. The routing control cache 605 holds the received terminal IDs and packet ID for a fixed period of time.

c) When the terminal, acting as a source terminal, generates and transmits packets to communicate with an arbitrary destination terminal, the packet analyzer 602 queries the hopcount cache 604 for the hopcount (n) to the destination terminal, sets a hopcount ceiling value (n+a) for communication with the destination terminal, and sends the hopcount ceiling value to the packet generator 603.

d) When the terminal routes a packet received by the communication unit 601, the packet analyzer 602 analyzes the packet to obtain the source address, the destination address, and the hopcount ceiling value. It also uses the source address as the ID of the source terminal and the destination address as the ID of the destination terminal to query the hopcount cache 604 for the associated hopcounts, receives the hopcount distance (s) of the source terminal ID and the hopcount distance (d) of the destination terminal ID from the hopcount cache 604, and adds them to obtain the hopcount (h=s+d) of the shortest path that can be routed through the terminal.

The hopcount cache 604 holds terminal IDs and hopcount values that have been received from the packet analyzer 602 for a certain period of time. If queried by the packet analyzer 602 about hopcount values associated with terminal IDs, the hopcount cache 604 returns them. The hopcount cache 604 has, for example, the table structure shown in FIG. 21, with entries consisting of the ID of a terminal, the hopcount distance to the terminal, and a retention time. The retention time value is decremented from an initial value toward zero as time elapses, and when the retention time value reaches zero, the entry is deleted.

The routing control cache 605 holds destination terminal IDs, neighboring relay terminal IDs, and packet IDs that have been received from the packet analyzer 602 for a fixed period of time. When queried by the packet generator 603 for the neighboring relay terminal IDs of a destination terminal ID, it returns all neighboring relay terminal IDs associated with the destination terminal ID. The routing control cache 605 has, for example, the table structure shown in FIG. 22, with entries consisting of a destination terminal ID, one or more neighboring relay terminal IDs, a packet ID, and a retention time value. The retention time value is decremented from an initial value as time elapses, and when the retention time value reaches zero, the entry is deleted. The neighboring relay terminal ID field and retention time value are updated based on the packet ID received from the packet analyzer 602. If a received packet ID matches the packet ID of an existing entry, the newly received neighboring terminal ID is added to the neighboring relay terminal ID(s) in the existing entry and the retention time of the existing entry is restored to the initial value. The set of neighboring relay terminal IDs is analogous to the neighboring terminal IDs in the distance vectors used in distance vector routing protocols, although the sixth embodiment does not employ distance vector routing. The routing control cache 605 is generally similar to the routing control cache used in the first embodiment.

The packet generator 603 generates packets and transmits them through the communication unit 601, performing some of the functions of the communication control unit in the preceding embodiments. In particular, the packet generator 603 performs the following operations A), B), and C).

A) The packet generator 603 generates and transmits route request packets, and generates and transmits packets replying to received route request packets.

B) When the terminal communicates with another terminal as a source terminal, the packet generator 603 adds the hopcount ceiling value (n+a) received from the packet analyzer 602 to packets that it generates by conventional methods and transmits the packets through the communication unit 601.

C) When the terminal relays a packet, the packet generator 603 queries the routing control cache 605 for the neighboring relay terminal IDs associated with the destination terminal ID of the packet, which is received from the packet analyzer 602. If one or more neighboring relay terminal IDs associated with the destination terminal ID are held in the routing control cache 605, they are returned from the routing control cache 605. The packet generator 603 then regenerates the packet, requesting relay to each of the neighboring terminals with IDs returned from the routing control cache 605, and transmits the packet through the communication unit 601. If no neighboring relay terminal ID is held in association with the destination terminal ID in the routing control cache 605, the packet is abandoned.

The operation of an ad hoc network formed by the terminals in the sixth embodiment will be described below.

First, the source terminal floods the network with packets requesting communication with the destination terminal.

In a terminal that receives a flooding packet, the packet analyzer 602 analyzes the packet, the hopcount cache 604 stores the source terminal ID and hopcount distance (s) from the source terminal, and the routing control cache 605 stores the destination terminal ID, neighboring terminal ID, and packet ID.

When the destination terminal receives the flooding packet from the source terminal and recognizes that it is the target of the route request, it replies to the source terminal by flooding the network with route reply packets.

In a terminal that receives a route reply packet, the packet analyzer 602 analyzes the packet, the hopcount cache 604 stores the ID of the destination terminal and the hopcount distance (d) from the destination terminal, and the routing control cache 605 stores the destination terminal ID, neighboring terminal ID, and packet ID.

The source terminal learns its hopcount distance (n) from the destination terminal (the hopcount distance from the source terminal to the destination terminal) by receiving the route reply packet from the destination terminal. The above steps are preparatory to routing.

Having obtained its hopcount distance (n) from the destination terminal in the above preparatory steps, the source terminal adds a hopcount ceiling value (n+a) to each packet it wants routed to the destination terminal, and transmits the packet via the communication unit 601 to the neighboring relay terminals associated with the destination terminal in the source terminal's routing control cache 605. More specifically, the hopcount cache 604 in the source terminal holds the hopcount (n) from the destination terminal as a result of the preparatory steps, the packet analyzer 602 in the source terminal queries the hopcount cache 604 to obtain this hopcount (n) and sets the hopcount ceiling value (n+a), and the packet generator 603 adds the hopcount ceiling value (n+a) to each packet to be routed to the destination terminal. The hopcount ceiling value may be set to the minimum value n (a=0) to ensure that the packet is routed only through the shortest path(s). There is (or was, at the preparatory stage) at least one such shortest path in the network. Alternatively, the packet analyzer 602 may set a higher ceiling value to allow greater path redundancy. It is also possible to set a predetermined hopcount ceiling value (n+a) at each terminal in the network, eliminating the need for the source terminal to select a hopcount ceiling value (n+a) and add it to the packets it transmits.

Figure 23:
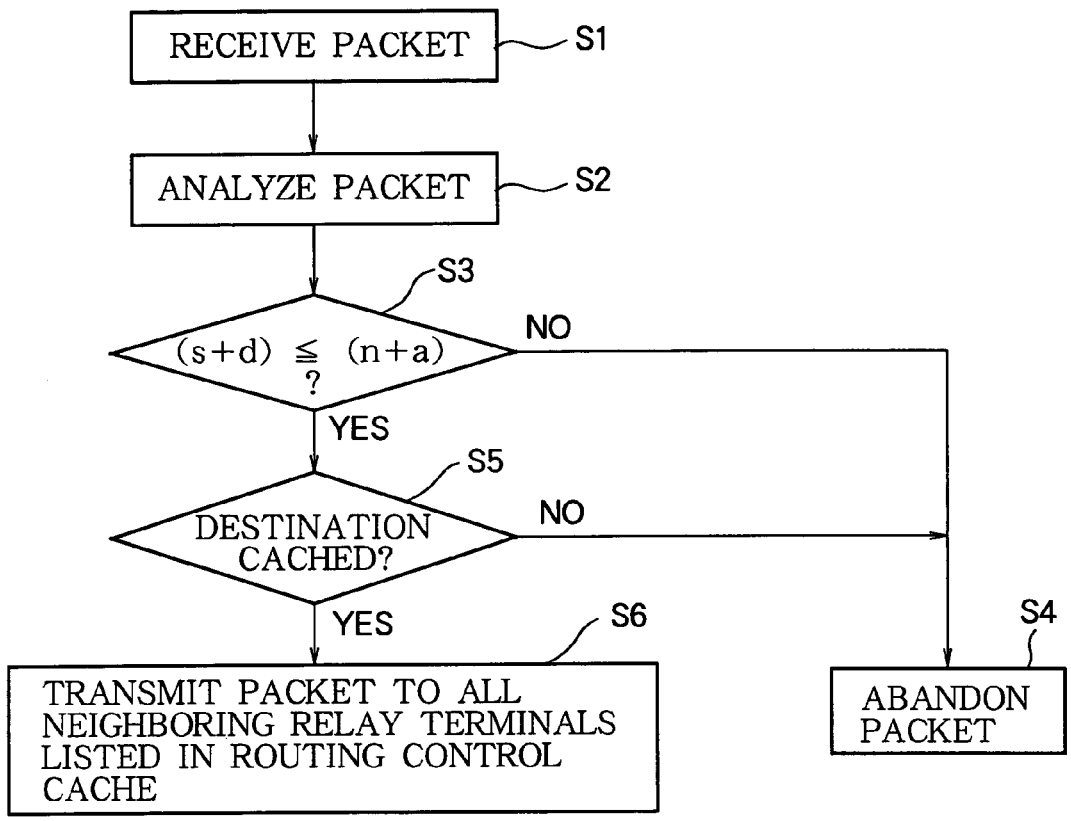
FIG. 23 is a flowchart illustrating the routing sequence in the communication terminal in FIG. 20.

FIG. 23 illustrates the subsequent routing procedure. A prospective relay terminal receives the packet with the hopcount ceiling value (n+a) set at the source terminal (step S1). The packet analyzer 602 of the receiving terminal analyzes the packet to obtain the source address (the ID of the source terminal), the hopcount distance (s) from the source terminal, the neighboring terminal ID, the packet ID, the destination address (the ID of the destination terminal), and the hopcount ceiling value (n+a), and updates the data held in the hopcount cache 604 and routing control cache 605 (step S2). Then the packet analyzer 602 obtains the hopcount distance (s) from the source terminal and the hopcount distance (d) from the destination terminal from the hopcount cache 604 to determine the hopcount (h=s+d) of a path routed through the prospective relay terminal (step S3), and compares this hopcount (h) with the ceiling value (n+a).

If h≦n+a, the packet analyzer 602 sends the packet and the destination terminal ID to the packet generator 603. Otherwise, the packet analyzer 602 abandons the packet (step S4).

Having received the packet and the destination terminal ID from the packet analyzer 602, the packet generator 603 queries the routing control cache 605 for the neighboring relay terminal IDs associated with the destination terminal ID (step S5).

If no neighboring relay terminal ID is held in the routing control cache 605 in association with the queried destination terminal ID, the packet generator 603 abandons the packet (step S4).

If one or more neighboring relay terminal IDs are held in the routing control cache 605 in association with the queried destination terminal ID, the packet generator 603 then regenerates the packet, requesting relay to each of the neighboring relay terminals with IDs returned from the routing control cache 605, and transmits the packet through the communication unit 601 (step S6).

These operations are performed in each prospective relay terminal, whereby the packet is transmitted from the source terminal to the destination terminal, enabling communication between them.

Figure 24A:
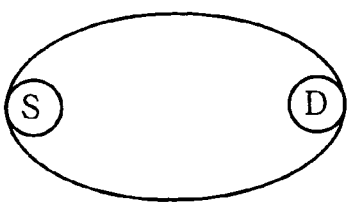
FIGS. 24A and 24B illustrate differences between the conventional method and the sixth embodiment.
Figure 24B:
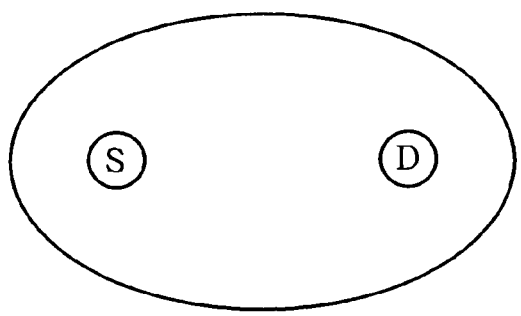

FIG. 24A schematically illustrates the result of routing by a conventional multipath method; FIG. 24B illustrates the result of routing in the sixth embodiment. In FIGS. 24A and 24B, the circled S indicates the source terminal S; the circled D indicates the destination terminal D. While the conventional method (FIG. 24A) forms unbalanced paths using relay terminals within an elliptical area tangent to terminals S and D in FIG. 24A, the method of the invention (FIG. 24B) enables formation of balanced paths by terminals within a larger elliptical area with terminals S and D at its foci.

Figure 25:
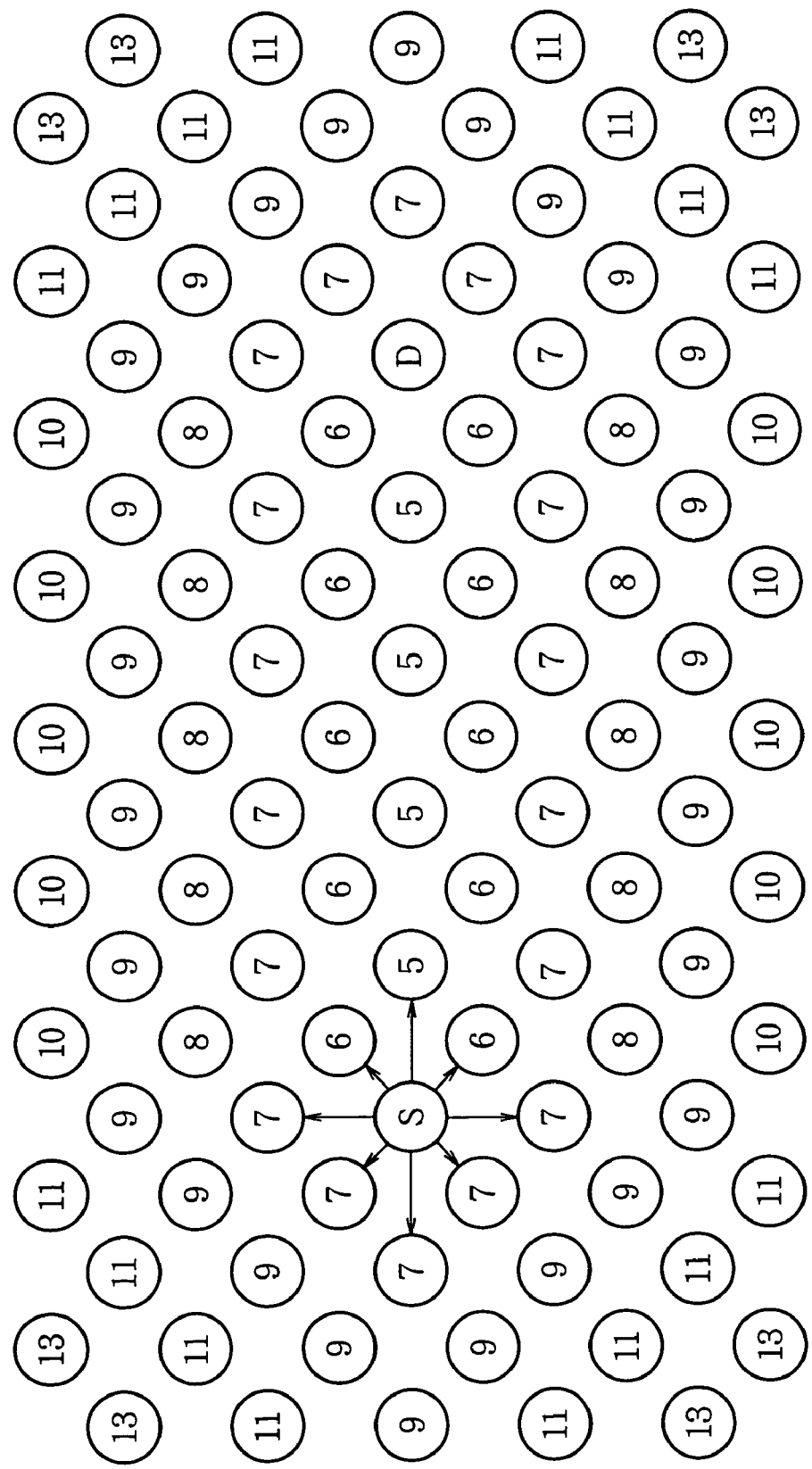
FIG. 25 illustrates the operation of an ad hoc network according to the sixth embodiment.
Figure 26:
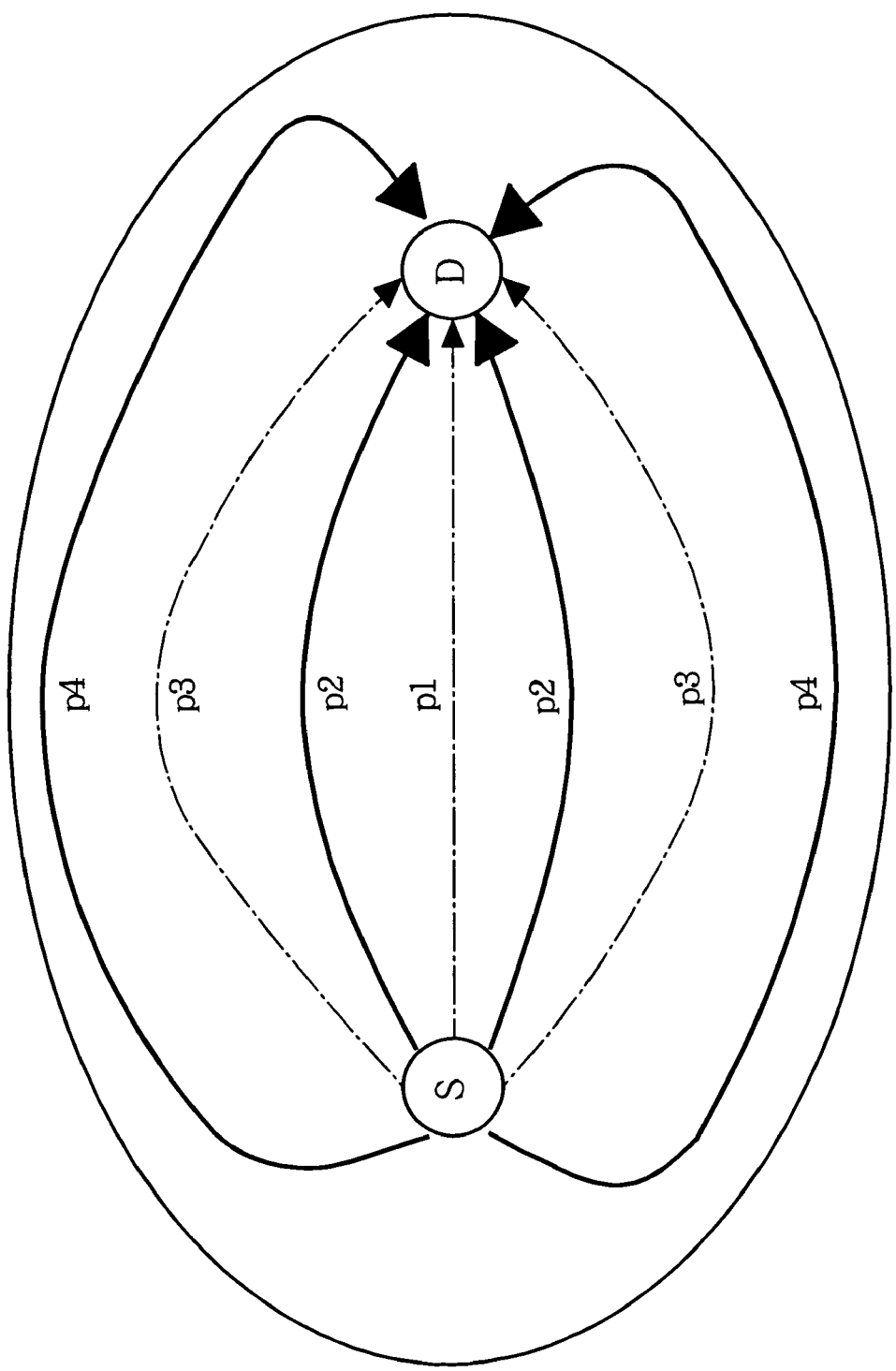
FIG. 26 illustrates multiple paths formed in the ad-hoc network in FIG. 25.

In FIGS. 25 and 26, a circle indicates a terminal; the circled S indicates the source terminal S; the circled D indicates the destination terminal D. The numerical values in the circles in FIG. 25 indicate the hopcount values (h) of the shortest paths that can be routed through the terminal. In FIG. 26, p1 indicates a path formed between terminals S and D through terminals with hopcount values h=5 in FIG. 25; p2 indicates a path formed between terminals S and D through terminals with hopcount values h=6 in FIG. 25; p3 indicates a path formed between terminals S and D through terminals with hopcount values h=7 in FIG. 25; p4 indicates a path formed between terminals S and D through terminals with hopcount values h=8 in FIG. 25.

Referring to FIG. 25, the shortest hopcount (n) from terminal S to terminal D is five (n=5). If a=2 is assumed, the hopcount ceiling is seven (n+a=7), so packets are routed only through terminals that meet the condition h≦7, in this case h=5, 6, or 7. Packets are therefore routed on the paths labeled p1, p2, and p3 in FIG. 26.

Referring again to FIG. 25, if a=3 is assumed, the hopcount ceiling is eight (n+a=8), so packets are routed only through terminals that meet the condition h≦8, in this case h=5, 6, 7, or 8, permitting packets to be routed on the paths labeled p1, p2, p3, and p4 in FIG. 26.

As described above, the sixth embodiment enables each prospective relay terminal to decide for itself whether to relay packets by comparing a hopcount value (h) with a ceiling value (n+a). Routing can be restricted to the shortest paths (if a=0) to minimize usage of network resources, or paths can be permitted to follow routes in an elliptical area with the source and destination terminals at its foci (if a≧1) so that a balanced distribution of paths can be obtained, providing improved immunity to radio interference.

Seventh Embodiment

The seventh embodiment is similar to the sixth embodiment, except that the source terminal (terminal S) varies the hopcount ceiling value of a relay path in the range between the minimum value (n, the hopcount on the shortest path) and the maximum value (n+α) in response to conditions such as communication instability. The size of the area of available relay terminals is thereby controlled flexibly to stabilize communication, mitigating the problem of unstable communication in ad hoc networks.

The seventh embodiment can generate paths that detour around the source and destination terminals as shown in FIG. 26, forming a balanced distribution of paths in the areas surrounding the source and destination terminals. Priority control can then be employed to form multiple paths with immunity to radio interference, as explained in the next embodiment.

Figure 27:
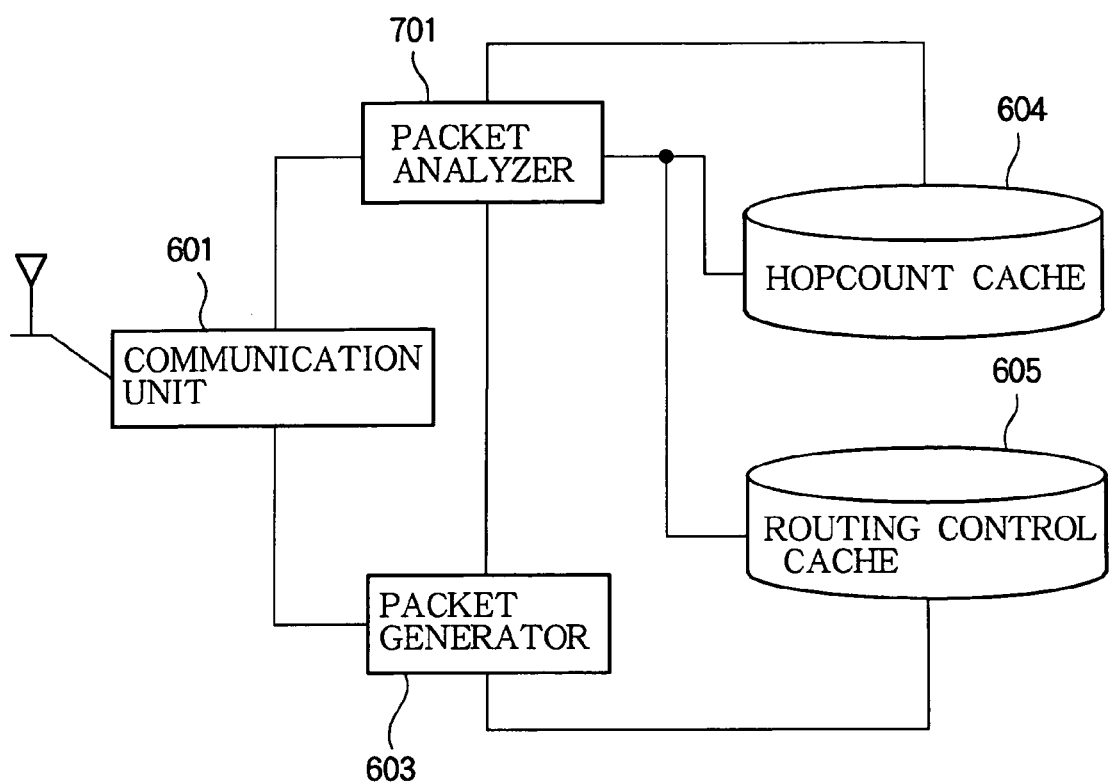
FIG. 27 is a block diagram of a communication terminal in a seventh embodiment of the invention.

Referring to FIG. 27, using the same reference numerals as in FIG. 20 for identical elements, each terminal in the seventh embodiment has a communication unit 601, a packet analyzer 701, a packet generator 603, a hopcount cache 604, and a routing control cache 605. The packet analyzer 701 in this embodiment replaces the packet analyzer 602 in the sixth embodiment (FIG. 20).

In the seventh embodiment, in the initial stage of communication, the packet analyzer 701 sets the hopcount ceiling to the minimum value (n), and monitors communication conditions. If communication is unstable, as detected from interruptions of communication, for example, the packet analyzer 701 gradually raises the hopcount ceiling, thereby broadening the area of available relay terminals and increasing the path redundancy, until communication is stabilized. The hopcount ceiling value may be incremented in steps of one to (n+1), (n+2), . . . , (n+α) as necessary.

If the hopcount ceiling value is too large, the entire network becomes overloaded, so the parameter ($\alpha$) that limits the maximum ceiling value is preferably small enough (1, 2, or 3, for example) that even when the maximum value (n+$\alpha$) is used, the load on the entire network is not markedly increased. If communication is interrupted even when the hopcount ceiling is set to the maximum value (n+$\alpha$), other measures should be taken: for example, the source terminal should reconfirm that communication is possible.

Figure 28:
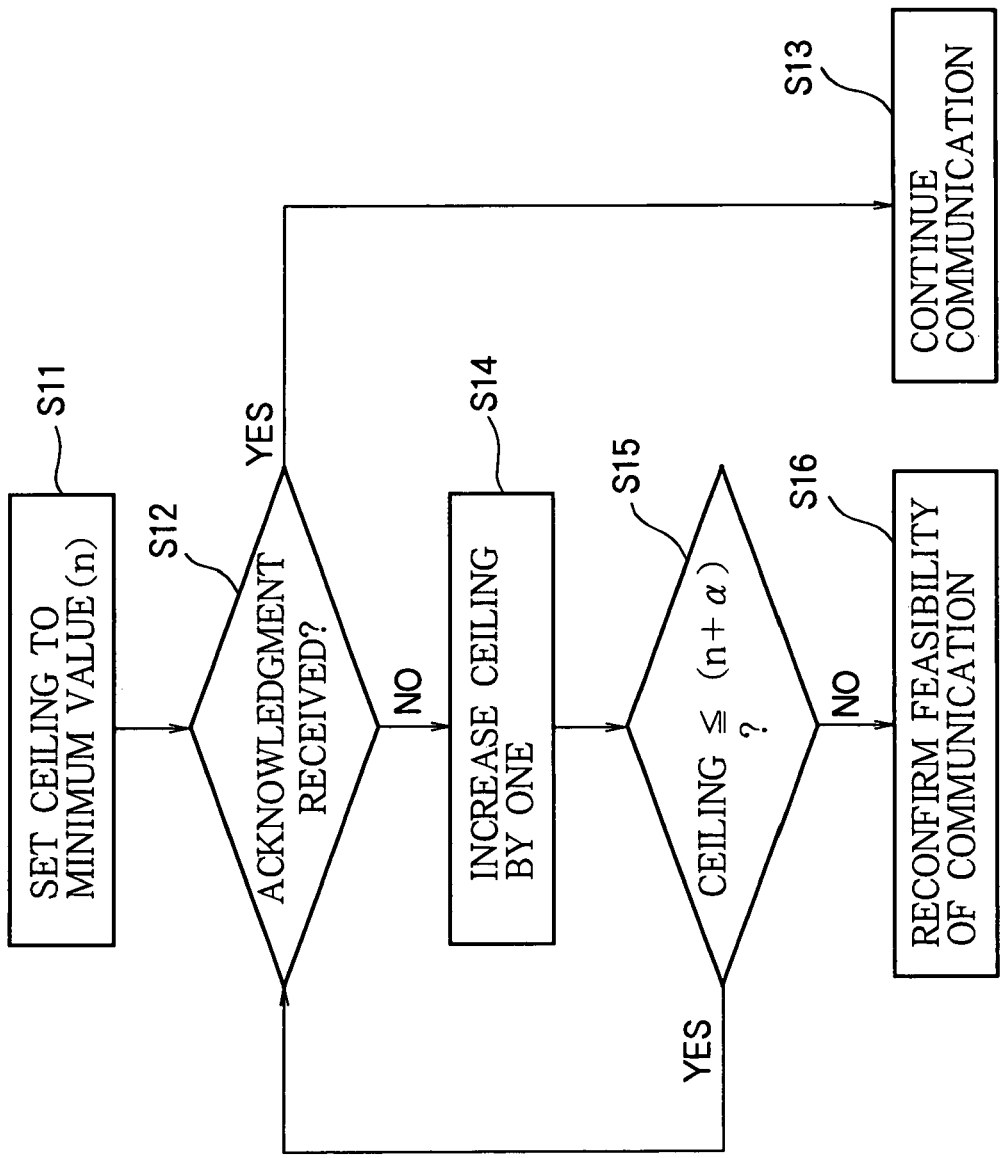
FIG. 28 is a flowchart illustrating a procedure for controlling the hopcount ceiling in the seventh embodiment.

Referring to FIG. 28, the packet analyzer 701 in the source terminal sets the minimum value (n) as the hopcount ceiling value, and the packet generator 603 adds the hopcount ceiling value to a packet and transmits the packet through the communication unit 601 (step S11).

The packet analyzer 701 then checks whether an acknowledgement (ACK) signal is received from the destination terminal. Reception of an acknowledgement signal indicates that communication has not been interrupted; failure to receive an acknowledgement signal indicates a communication interruption (step S12).

If there is no communication interruption, the packet analyzer 701 uses the current hopcount ceiling value to continue communication (step S13).

When a communication interruption is recognized, the packet analyzer 701 increments the hopcount ceiling value by one, adds the incremented hopcount value to the packet, and retransmits the packet (step S14).

When the hopcount ceiling value is altered, the packet analyzer 701 decides whether the altered value is equal to or less than the maximum permissible value (n+$\alpha$) or not (step S15).

If the altered value is equal to or less than (n+$\alpha$) the packet analyzer 701 then checks whether an acknowledgement signal is received from the destination terminal (step S12).

If the altered value is greater than (n+$\alpha$), the packet analyzer 701 reconfirms whether communication is possible or not (step S16).

As described above, the seventh embodiment increments the hopcount ceiling value as necessary when communication is interrupted, thereby increasing the number of redundant communication paths and enabling communication to be stabilized.

Eighth Embodiment

The eighth embodiment has each relay terminal within the permissible hopcount ceiling (h$\leq$n+a) in the sixth and seventh embodiments determine the priority of its own path, and uses the priority to control routing, thereby forming multiple paths with reduced interference.

The eighth embodiment introduces a control method in which packets are relayed only by terminals with a route hopcount value (h) meeting a condition such as h % 2=0l h % 2=1, h % 3=0, h % 3=1, or h % 3=2, as well as the condition h$\leq$(n+a), thereby forming multiple paths with reduced interference. The notation h % 2 represents the integer remainder when the hopcount value (h) is divided by two; the notation h % 3 represents the integer remainder when the hopcount value (h) is divided by three.

Figure 29:
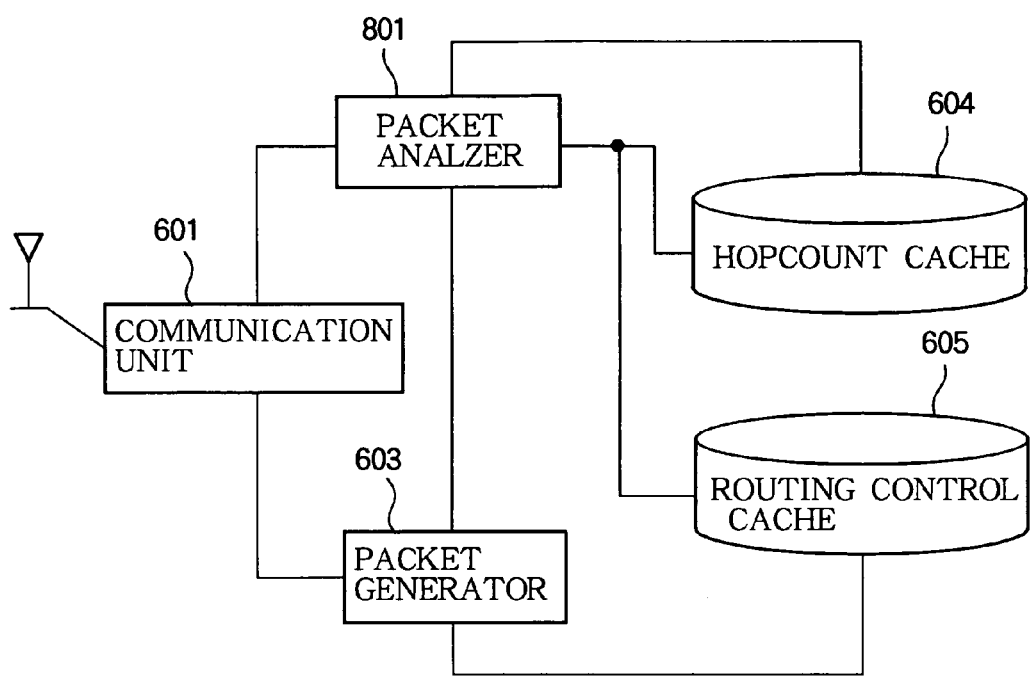
FIG. 29 is a block diagram of a communication terminal in an eighth embodiment of the invention.

Referring to FIG. 29, using the same reference numerals as in FIG. 20 for identical elements, the terminal in the eighth embodiment has a communication unit 601, a packet analyzer 801, a packet generator 603, a hopcount cache 604, and a routing control cache 605. The packet analyzer 801 in this embodiment replaces the packet analyzer 602 in the sixth embodiment.

The packet analyzer 801 generates a message specifying both the hopcount ceiling value (n+a) and a priority control condition such as the condition h % 2=1, and sends the message to the packet generator 603 to have it added to a packet to be transmitted. It is also possible to determine the priority control condition for each terminal in the network in advance, eliminating the need for the source terminal to add priority control conditions to packets.

The packet analyzer 801 analyzes a received packet to obtain the priority control condition, and determines whether its route hopcount value (h) satisfies the condition h$\leq$n+a and the priority control condition. If the hopcount value (h) satisfies both conditions, the packet analyzer 801 sends the packet to the packet generator 603; otherwise, it abandons the packet.

Referring to FIG. 25, for example, the shortest route between terminal S and terminal D has a hopcount (n) of five hops. If a=2, the hopcount ceiling value is seven (n+a=7), and if only terminals satisfying the conditions h$\leq$7 and h % 2=1 are permitted to relay packets, packets are routed through terminals with route hopcount values of five or seven (h=5 or 7), but not through terminals with a route hopcount value of six (h=6). Referring to FIG. 26, there are many paths, e.g. p1, p2, and p3, consisting of terminals satisfying the condition h$\leq$7, but only the paths labeled p1 and p3, consisting of terminals with h=5 and h=7, are used.

Similarly, again referring to FIG. 25, if a=3, the hopcount ceiling value is eight (n+a=8), and if only terminals satisfying the conditions h$\leq$8 and h % 3=1 are permitted to relay packets, packets are routed through terminals with a route hopcount value of seven (h=7), but not through terminals with route hopcount values of five, six, or eight (h=5, 6, or 8). Therefore, among the paths labeled p1, p2, and p3 in FIG. 26, consisting of terminals satisfying the condition h$\leq$7, only the paths labeled p3, consisting of terminals with h=7, are used.

Assuming a=3 again, if terminals satisfying the conditions h$\leq$8 and h % 3=2 are permitted to relay packets, relay is theoretically possible through terminals with hopcounts of five or eight (h=5 or 8), but since terminals with hopcounts of six or seven (h=6 or 7) cannot be relay terminals, in practice it is not possible to route packets through terminals with hopcounts of eight (h=8), and all packets must be routed through terminals with hopcounts of five (h=5), which is not the intended result.

To avoid this unintended result, it is necessary for a packet originating from terminal S to be received by a nearby terminal with a hopcount of eight (h=8), and for packets that have arrived at a terminal with a hopcount of eight (h=8) near terminal D to be relayed to terminal D.

Therefore, the terminals near the source terminal (terminal S) and the destination terminal (terminal D) perform a type of bypass routing control (unconditional relaying). More specifically, terminals within a certain hopcount distance (m) of the source or destination terminal relay packets unconditionally.

Referring to FIG. 25, assuming a=3, if only terminals satisfying the conditions h$\leq$8 and h % 3=2 are permitted to be relay terminals, routing control is performed so that bypass routing is carried out through terminals within two hops (m=a−1=2) of the source terminal or the destination terminal.

To enable bypass routing (unconditional relay), the packet generator 603 of the source terminal (terminal S) adds to outgoing packets both a message specifying the hopcount ceiling value (n+a) and the priority control condition (h % 3=2), and a bypass routing message specifying, for example, that terminals with a hopcount distance (s) from the source terminal (terminal S) or a hopcount distance (d) from the destination terminal (terminal D) equal to or less than a certain distance (m) should relay packets unconditionally. If the hopcount of the shortest path (n) is in the range of values from 8 to 12, m should be set in the range of values from 3 to 5. The bypass routing condition message can also be replaced with a bypass routing flag and the bypass value (m) can be added to the headers of packets.

The packet analyzer 801 of a relay terminal analyzes a received packet to determine whether a bypass routing condition is added or not. If a bypass routing condition is added, the packet analyzer 801 determines whether the hopcount distance (s) from terminal S or the hopcount distance (d) from terminal D satisfies the condition s≦m or d≦m or not. If the condition s≦m or d≦m is satisfied, the packet analyzer 801 unconditionally (without determining whether the conditions relating to the route hopcount value (h) is satisfied or not) sends the packet to the packet generator 603 to be relayed. Otherwise, the packet analyzer 801 determines whether the terminal satisfies the conditions relating to the route hopcount value (h) or not. If these conditions are satisfied, the packet analyzer 801 sends the packet to the packet generator 603 to be relayed; otherwise, the packet analyzer 801 abandons the packet.

Compared with the sixth embodiment, the eighth embodiment thins out the paths, enabling the selection of multiple paths with reduced interference.

Ninth Embodiment

The ninth embodiment has each relay terminal compare the shortest hopcount distance (n) with its own route hopcount value (h) to determine a priority, and uses the priority to control routing to form multiple paths with reduced interference, thereby enabling effective use of network resources and reducing packet loss and delay caused by radio interference among multiple paths.

The ninth embodiment determines the difference (h−n) between the shortest hopcount distance (n) and each terminal's route hopcount value (h) as the terminal's remoteness from the shortest path, and uses this remoteness value to prioritize multiple paths. Terminals with a remoteness value of zero have highest priority and relay packets without delay. These terminals are located on the shortest path, or one of a plurality of shortest paths, and have the minimum route hopcount value (h=n). Terminals with higher remoteness values have lower priorities; these terminals hold a received packet in suspension for a predetermined times, waiting to see whether the packet is routed through other terminals forming a path with higher priority. If they detect that the packet has been routed on a higher-priority path within the predetermined time, they abandon the suspended packet; otherwise, they relay the suspended packet.

Whether a packet has been routed through another path or not is determined by whether the terminal receives a packet identical to the suspended packet within the predetermined suspension time or not. If the terminal receives a packet identical to the suspended packet within the predetermined suspension time, it assumes that the packet has been routed on a higher-priority path, and abandons both the received and suspended packets; otherwise, it assumes that the packet has not been routed on a higher-priority path and relays the suspended packet itself.

For example, assuming that the hopcount ceiling value is n+3, a terminal with zero remoteness from the shortest path (h−n=0) relays the received packet without delay; a terminal with a remoteness value of one (h−n=1) suspends the received packet for a time A; a terminal with a remoteness value of two (h−n=2) suspends the received packet for a time B (where B>A); a terminal with a remoteness value of three (h−n=3) suspends the received packet for a time C (where C>B). A suspended packet is abandoned if an identical packet is received within the suspension time, and is relayed if an identical packet is not received within the suspension time.

Referring to FIG. 30, the terminal in the ninth embodiment has a communication unit 601, a packet analyzer 901, a packet generator 603, a hopcount cache 604, a routing control cache 605, a packet monitor 902, and a suspension time selector 903. The terminal in this embodiment is thus similar to the terminal in the sixth embodiment, with the addition of the packet monitor 902 and the suspension time selector 903 and the replacement of the packet analyzer 602 by the packet analyzer 901.

The packet analyzer 901 in a source terminal sends both the hopcount ceiling value (n+a) and the hopcount value (n) of the shortest path to the packet generator 603 to be added to outgoing packets.

The packet analyzer 901 in a relay terminal analyzes the received packet to obtain the hopcount value (n) of the shortest path and uses this hopcount value (n) and its route hopcount value (h) to determine the remoteness (h−n) of its route from the shortest path. If the route hopcount value (h) satisfies the condition h≦n+a and the remoteness from the shortest path is zero (h−n=0), the terminal concludes that it is on a path with highest priority (the shortest path, or one of the shortest paths), and sends the packet to the packet generator 603 to be transmitted through the communication unit 601; if the route hopcount value (h) satisfies the condition h≦n+a and the remoteness from the shortest path is greater than zero (h−n≧1), the terminal concludes that it is on a path with lower priority, and sends the packet and the remoteness value (h−n) to the packet monitor 902, which suspends the packet for a retention time set by the suspension time selector 903; otherwise, the packet is abandoned.

The packet monitor 902 holds a packet that has been received from the packet analyzer 901 in suspension for a suspension time set according to the remoteness from the shortest path (h−n) by the suspension time selector 903. If the packet monitor 902 receives another packet identical to the suspended packet within the suspension time, indicating that the packet has been routed on another path with higher priority, it abandons both the suspended and received packets; if the suspension time passes without the reception of an identical packet, the packet monitor 902 concludes that the packet could not be routed on a higher-priority path, and sends the suspended packet to the packet generator 603, which uses the communication unit 601 to transmit the packet.

The suspension time selector 903 sets the suspension time for which the packet monitor 902 holds packets in proportion to remoteness from the shortest path (h−n). For example, if the remoteness value is one (h−n=1), the suspension time selector 903 sets a suspension time A; if the remoteness from the shortest path is two (h−n=2), it sets a longer suspension time B (B>A).

This suspension scheme enables the ninth embodiment to avoid unnecessary redundant routing and form multiple paths with reduced interference, as compared with the sixth embodiment.

The present invention is not limited to the embodiments and variations described above. Those skilled in the art will recognize that further variations are possible within the scope of the invention, which is defined in the appended claims.

What is claimed is:

1. A communication terminal for use in a communication network formed by a plurality of communication terminals that communicate with each other, the plurality of communication terminals having respective identifiers (IDs), the communication terminal being one of the plurality of communication terminals, the communication terminal comprising:

a communication control unit controlling operations of the communication terminal, the operations including transmitting data to the plurality of communication terminals and receiving data from the plurality of communication terminals;

a source and destination analyzer for analyzing received data to obtain the IDs of a source terminal and a destination terminal of the received data;

a neighboring terminal ID analyzer for analyzing the received data to obtain the ID of a neighboring terminal from which the data was directly received;

an expiration time storage unit for storing an initial value of a relay time, the initial value being greater than zero; and a routing control cache for holding at least one destination terminal ID and an associated relay terminal ID, and an associated relay time, and decrementing the associated relay time as time elapses;

wherein the communication control unit adds the ID of the source terminal obtained by the source and destination analyzer and the ID obtained by the neighboring terminal ID analyzer to the routing control cache as a new destination terminal ID and associated neighboring relay terminal ID if they are not already stored in the routing control cache as a destination terminal ID and associated neighboring relay terminal ID, also writing the initial value of the relay time in the routing control cache in association with the new destination terminal ID and neighboring relay terminal ID, compares the ID of the destination terminal obtained by the source and destination analyzer with the at least one destination terminal ID stored in the routing control cache to decide whether to route the received data toward the destination terminal, restores the associated relay time held in the routing control cache to the initial value if the source terminal of the received data and the ID of the neighboring terminal are already stored in the routing control cache as a destination terminal ID and associated neighboring relay terminal ID, deletes a destination terminal ID and associated neighboring relay terminal ID from the routing control cache when the associated relay time reaches zero, relays the received data to all neighboring terminals having IDs held in the routing control cache as relay terminal IDs in association with the ID of the destination terminal of the received data, and abandons the received data if the ID of the destination terminal of the received data is not held in the routing control cache as a destination terminal ID.

2. The communication terminal of claim 1, further comprising a hopcount cache for storing IDs and associated hopcounts, wherein the source and destination analyzer also obtains the number of hops from the source terminal of the received data, and the communication control unit updates the hopcount associated with the ID of the source terminal obtained by the source and destination analyzer by writing the number of hops obtained by the source and destination analyzer in the hopcount cache, if the ID of the source terminal is already stored in the hopcount cache, relays the received data to all neighboring terminals having IDs held in the routing control cache as relay terminal IDs in association with the ID of the destination terminal of the received data, provided the sum of the hopcount associated with the ID of the source terminal of the received data and the hopcount associated with the ID of the destination terminal of the received data in the hopcount cache does not exceed a value specified in the received data, and abandons the received data if the ID of the destination terminal of the received data is not held in the routing control cache as a destination terminal ID or the sum of the hopcount associated with the ID of the source terminal of the received data and the hopcount associated with the ID of the destination terminal of the received data in the hopcount cache exceeds the value specified in the received data.

3. The communication terminal of claim 2, wherein the hopcount cache also stores a retention time in association with each stored ID, and decrements the retention time as time elapses, the retention time associated with the ID being restored to an initial value when the hopcount associated with the ID is updated, the stored ID and associated hopcount being deleted from the hopcount cache when the associated retention time reaches zero.

4. The communication terminal of claim 1, further comprising a neighboring terminal ID storage unit for holding the ID obtained by the neighboring terminal ID analyzer in association with a retention time, and decrementing the retention time from an initial value as time elapses, wherein:

the expiration time storage unit also holds an initial value of the retention time, and the communication control unit adds the ID of the neighboring terminal obtained by the neighboring terminal ID analyzer to the neighboring terminal ID storage unit if it is not already stored in the neighboring terminal ID storage unit, also writing the initial value of the retention time in the neighboring terminal ID storage unit in association with ID of the neighboring terminal, restores the associated retention time held in the neighboring terminal ID storage unit to the initial value if the ID of the neighboring terminal obtained by the neighboring terminal ID analyzer is already stored in the neighboring terminal ID storage unit, and deletes the ID of the neighboring terminal from the neighboring terminal ID storage unit when the associated retention time reaches zero.

5. The communication terminal of claim 4, further comprising:

a routing analyzer for analyzing received data including a route request to obtain a pair of endpoint terminal IDs, and analyzing received data including a route command to obtain a pair of endpoint terminal IDs; and a routing controller for generating route command data from the received data including a route request;

wherein the expiration time storage unit also holds an, initial value of a retention time, and the communication control unit adds the ID of the neighboring terminal obtained by the neighboring terminal ID analyzer to the neighboring terminal ID storage unit if it is not already stored in the neighboring terminal ID storage unit, also writing the initial value of the retention time in the neighboring terminal ID storage unit in association with ID of the neighboring terminal, restores the associated retention time held in the neighboring terminal ID storage unit to the initial value if the ID of the neighboring terminal obtained by the neighboring terminal ID analyzer is already stored in the neighboring terminal ID storage unit, deletes the ID of the neighboring terminal from the neighboring terminal ID storage unit when the associated retention time reaches zero, adds the IDs of the pair of endpoint terminals obtained by the routing analyzer to the routing control cache if they are not already stored in the routing control cache, also writing the initial value of the relay time in the routing control cache in association with IDs of the pair of endpoint terminals, restores the associated relay time held in the routing control cache to the initial value if the IDs of the pair of endpoint terminals obtained by the routing analyzer are already stored in the routing control cache, deletes the IDs of the pair of endpoint terminals from the routing control cache when the associated relay time reaches zero, sends route command data to certain other communication terminals in the network as specified by the route request data relays received data to all neighboring terminals with IDs held in the neighboring terminal ID storage unit if the source and destination terminal IDs of the received data obtained from the source and destination analyzer are stored in the routing control cache, and abandons the received data if the source and destination terminal IDs of the received data obtained from the source and destination analyzer are not stored in the routing control cache.

6. The communication terminal of claim 4, further comprising a hopcount controller for analyzing the received data to obtain the number of hops from the source terminal of the received data and the number of hops to the destination terminal of the received data, wherein the communication control unit:

writes the source terminal ID of the received data in a hopcount cache as a destination terminal ID, if the source terminal ID of the received data is not already stored in the hopcount cache as a destination terminal ID, also writing the initial value of the relay time and the number of hops from the source terminal of the received data in the hopcount cache in association with the destination terminal ID;

restores the relay time associated with the source terminal ID of the received data to the initial value of the relay time, if the source terminal ID of the received data is already stored in the hopcount cache as a destination terminal ID, also writing the number of hops to the source terminal of the received data in the hopcount cache in association with the source terminal ID of the received data; deletes the ID stored in the hopcount cache as a destination terminal ID when the associated relay time reaches zero;

relays the received data to all neighboring terminals with IDs stored in the neighboring terminal ID storage unit, decrementing the number of hops to the destination terminal by one, if the destination terminal ID of the received data obtained by the source and destination analyzer is stored in the hopcount cache and the number of hops to the destination terminal stored in the hopcount cache in association with the destination terminal ID is less than the number of hops to the destination terminal obtained from the received data by the hopcount controller, and abandons the received data if the destination terminal ID of the received data is not stored in the hopcount cache, or the number of hops to the destination terminal stored in the hopcount cache in association with the destination terminal ID is greater than the number of hops to the destination terminal obtained from the received data by the hopcount controller.

7. The communication terminal of claim 6, wherein the communication control unit relays the received data if the number of hops to the destination terminal stored in the hopcount cache in association with the destination terminal ID is equal to the number of hops to the destination terminal obtained from the received data by the hopcount controller.

8. The communication terminal of claim 6, wherein the communication control unit abandons the received data if the number of hops to the destination terminal stored in the hopcount cache in association with the destination terminal ID is equal to the number of hops to the destination terminal obtained from the received data by the hopcount controller.

9. The communication terminal of claim 4, further comprising a motion sensor for detecting motion of the communication terminal, wherein:

when the motion sensor detects motion of the communication terminal, the communication control unit transmits data with a request to delete the ID of the communication terminal; and if the communication control unit receives data with a request to delete the ID of another communication terminal in the network, the communication control unit deletes the ID of the other communication terminal from the neighboring terminal ID storage unit.

10. The communication terminal of claim 9, wherein the motion sensor comprises an oscillation detector for detecting motion from a pendulum inclination.

11. The communication terminal of claim 4, further comprising:

a motion detector for detecting a velocity and direction of motion of the communication terminal; and a motion controller for managing the velocity and direction of motion of the communication terminal and the velocity and direction of motion of other communication terminals in the network as reported in data received from the other terminals, determining relative motion of a neighboring terminal with respect to motion of the communication terminal itself, and deciding whether the relative motion exceeds a predetermined value, wherein the communication control unit transmits data including the velocity and direction of motion of the communication terminal; and if the relative motion of the neighboring terminal exceeds the predetermined value, the communication control unit deletes the ID of the neighboring terminal from the neighboring terminal ID storage unit.

12. The communication terminal of claim 11, wherein the motion detector detects velocity from a global positioning system.

13. A communication network comprising a plurality of communication terminals as described in claim 1.

* * * * *